United States Patent
Schell et al.

(10) Patent No.: US 9,168,585 B2
(45) Date of Patent: Oct. 27, 2015

(54) COUPLING WITH EXTENDING PARTING LINE

(71) Applicant: Mueller International, LLC, Atlanta, GA (US)

(72) Inventors: Ty Schell, Reinholds, PA (US); Patrick M. McCrea, Lancaster, PA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 13/667,786

(22) Filed: Nov. 2, 2012

(65) Prior Publication Data
US 2014/0125054 A1    May 8, 2014

(51) Int. Cl.
| | |
|---|---|
| F16L 17/00 | (2006.01) |
| B22D 25/02 | (2006.01) |
| B22D 29/00 | (2006.01) |
| F16L 17/04 | (2006.01) |
| B22C 9/04 | (2006.01) |

(52) U.S. Cl.
CPC ............. *B22D 25/02* (2013.01); *B22C 9/046* (2013.01); *B22D 29/00* (2013.01); *F16L 17/04* (2013.01)

(58) Field of Classification Search
USPC ................... 285/111, 112, 367, 337, 419, 373
See application file for complete search history.

(56) References Cited

U.S. PATENT DOCUMENTS

| | | |
|---|---|---|
| 29,731 A | 8/1860 | Truss |
| 815,581 A | 3/1906 | Dean |
| 1,006,294 A | 10/1911 | Schubart |
| 1,093,868 A | 4/1914 | Leighty |
| 1,352,918 A | 9/1920 | Rohbock |
| 1,541,601 A | 6/1925 | Tribe |
| 1,851,574 A | 3/1929 | Fiederlein |
| 1,930,194 A | 10/1930 | Dillon |
| 1,833,776 A | 11/1931 | Dillon |
| 1,987,235 A | 1/1932 | Janeway |
| 1,867,891 A | 7/1932 | Baillie |
| 1,881,508 A | 10/1932 | Gredell |
| 1,937,881 A | 12/1933 | Fisher |
| 1,970,078 A | 8/1934 | Dillon |
| 2,020,156 A | 11/1935 | Muchnic |
| 2,041,132 A | 5/1936 | Johnson |
| 2,369,770 A | 2/1945 | Baxter |
| 2,377,510 A | 6/1945 | Newell |

(Continued)

FOREIGN PATENT DOCUMENTS

| | | |
|---|---|---|
| CA | 2732427 | 1/2015 |
| DE | 1051585 | 2/1959 |

(Continued)

OTHER PUBLICATIONS

Vandal; International Search Report and Written Opinion for serial No. PCT/US/09/48637, filed Jun. 25, 2009, mailed Jan. 4, 2010; 15 pgs.

(Continued)

*Primary Examiner* — Aaron Dunwoody
(74) *Attorney, Agent, or Firm* — Taylor English Duma LLP

(57) ABSTRACT

A coupling includes at least one coupling segment, each segment including an outer surface, an inner surface, at least two ends, fastener pads protruding proximate to each end, and a parting line extending around each segment, the parting line forming an axially outermost edge along each axial side of each coupling segment, the parting line offset from a top surface of each fastener pad.

19 Claims, 9 Drawing Sheets

(56) References Cited

U.S. PATENT DOCUMENTS

| | | | |
|---|---|---|---|
| 2,439,979 | A | 4/1948 | Krooss |
| 2,449,795 | A | 9/1948 | Sillwagon |
| 2,456,048 | A | 12/1948 | Carpenter |
| 2,473,046 | A | 6/1949 | Adams |
| 2,473,102 | A | 6/1949 | Krooss |
| 2,486,120 | A | 10/1949 | Colton et al. |
| 2,616,946 | A | 11/1952 | Scheer |
| 2,675,253 | A | 4/1954 | Stade |
| 2,688,170 | A | 9/1954 | Balzer |
| 2,688,500 | A | 9/1954 | Scott |
| 2,752,173 | A | 6/1956 | Krooss |
| 2,754,136 | A | 7/1956 | Newton |
| 2,816,780 | A | 12/1957 | Ross |
| 2,821,415 | A | 1/1958 | Race |
| 2,944,839 | A | 7/1960 | Anderson |
| 2,950,930 | A | 8/1960 | Dunmire |
| 2,962,305 | A | 11/1960 | McCarthy et al. |
| 3,003,793 | A | 10/1961 | Pitt |
| 3,004,781 | A | 10/1961 | Morris |
| 3,014,259 | A | 12/1961 | Joseph |
| 3,015,502 | A | 1/1962 | Frost et al. |
| 3,024,046 | A | 3/1962 | Frost et al. |
| 3,054,629 | A | 9/1962 | Piatek |
| D196,724 | S | 10/1963 | Davis |
| 3,107,108 | A | 10/1963 | Greene |
| 3,134,612 | A | 5/1964 | Glasgow |
| 3,135,154 | A | 6/1964 | Zenzic |
| 3,153,550 | A | 10/1964 | Hollett |
| 3,176,723 | A | 4/1965 | Hodgeman et al. |
| 3,181,896 | A | 5/1965 | Russell |
| 3,189,969 | A * | 6/1965 | Sweet ............................ 24/279 |
| 3,201,149 | A | 8/1965 | Bragg |
| 3,207,538 | A | 9/1965 | Pattillo |
| 3,213,817 | A | 10/1965 | Kish |
| 3,251,615 | A | 5/1966 | Short, III |
| 3,283,553 | A | 11/1966 | Taylor |
| 3,285,568 | A | 11/1966 | Biach |
| 3,291,506 | A | 12/1966 | Blakeley |
| 3,298,698 | A | 1/1967 | Condon |
| 3,313,197 | A | 4/1967 | Knohl |
| 3,315,970 | A | 4/1967 | Holoway |
| 3,329,446 | A | 7/1967 | Katis et al. |
| 3,351,352 | A | 11/1967 | Blakeley et al. |
| 3,362,730 | A | 1/1968 | St. Clair et al. |
| 3,386,771 | A | 6/1968 | Verdier et al. |
| 3,425,473 | A | 2/1969 | Knowlton |
| 3,464,722 | A | 9/1969 | Larkin |
| 3,524,662 | A | 8/1970 | Tolman et al. |
| 3,550,638 | A | 12/1970 | Smith |
| 3,658,367 | A | 4/1972 | Pfeuffer |
| 3,664,691 | A | 5/1972 | Nakamura |
| 3,680,619 | A | 8/1972 | Sparks |
| 3,680,894 | A | 8/1972 | Young |
| 3,695,638 | A | 10/1972 | Blakeley |
| RE27,736 | E | 8/1973 | Muhlner et al. |
| 3,794,361 | A | 2/1974 | Westberg |
| 3,797,078 | A | 3/1974 | LaPointe |
| 3,807,435 | A | 4/1974 | Fenster et al. |
| 3,856,245 | A | 12/1974 | Byerly |
| 3,877,733 | A | 4/1975 | Straub |
| 3,905,623 | A | 9/1975 | Cassel |
| 3,966,237 | A | 6/1976 | Thiessen |
| 3,977,705 | A | 8/1976 | Thiessen et al. |
| 4,034,788 | A | 7/1977 | Melone |
| 4,064,921 | A | 12/1977 | Kose |
| 4,108,479 | A | 8/1978 | Straub |
| 4,109,941 | A | 8/1978 | Wood et al. |
| 4,111,234 | A | 9/1978 | Wells et al. |
| 4,114,414 | A | 9/1978 | Goodman |
| 4,131,302 | A | 12/1978 | Leonard, Jr. |
| 4,137,610 | A | 2/1979 | Hoen |
| 4,176,865 | A | 12/1979 | Felton et al. |
| D256,046 | S | 7/1980 | Perrin |
| 4,258,361 | A | 3/1981 | Hydes et al. |
| 4,258,941 | A | 3/1981 | Sands |
| 4,304,415 | A | 12/1981 | Wolf et al. |
| 4,311,248 | A | 1/1982 | Westerlund et al. |
| 4,326,737 | A | 4/1982 | Lehmann |
| 4,350,350 | A | 9/1982 | Blakeley |
| 4,377,894 | A | 3/1983 | Yoshida |
| 4,391,458 | A | 7/1983 | Blakeley |
| 4,403,378 | A | 9/1983 | Engman |
| 4,408,788 | A | 10/1983 | Beukema |
| 4,417,755 | A | 11/1983 | Gittleman |
| 4,432,558 | A | 2/1984 | Westerlund et al. |
| 4,438,958 | A | 3/1984 | De Cenzo |
| 4,445,533 | A | 5/1984 | DeFrees |
| 4,471,979 | A | 9/1984 | Gibb et al. |
| 4,480,861 | A | 11/1984 | Cann, Jr. |
| 4,506,418 | A | 3/1985 | Viola et al. |
| 4,518,177 | A | 5/1985 | Deakins |
| 4,522,433 | A | 6/1985 | Valentine et al. |
| 4,522,434 | A * | 6/1985 | Webb ............................ 285/112 |
| 4,568,115 | A | 2/1986 | Zimmerly |
| 4,601,495 | A | 7/1986 | Webb |
| 4,611,839 | A | 9/1986 | Rung et al. |
| 4,616,858 | A | 10/1986 | Sauer |
| 4,629,217 | A | 12/1986 | Straub |
| 4,639,020 | A | 1/1987 | Rung et al. |
| 4,643,461 | A | 2/1987 | Thau, Jr. |
| D289,078 | S | 3/1987 | Vassallo et al. |
| 4,664,422 | A | 5/1987 | Straub |
| 4,702,499 | A | 10/1987 | deRaymond et al. |
| 4,702,500 | A | 10/1987 | Thau, Jr. et al. |
| 4,717,299 | A | 1/1988 | Underwood |
| 4,722,561 | A | 2/1988 | Heckelthorn et al. |
| 4,726,611 | A | 2/1988 | Sauer |
| 4,739,542 | A | 4/1988 | Krzesicki |
| 4,776,362 | A | 10/1988 | Domingue, Sr. et al. |
| 4,861,075 | A | 8/1989 | Pepi et al. |
| 4,893,843 | A | 1/1990 | DeRaymond |
| 4,896,902 | A | 1/1990 | Weston |
| 4,915,418 | A | 4/1990 | Palatchy |
| 4,966,395 | A | 10/1990 | Hendrickson |
| 5,018,548 | A | 5/1991 | McLennan |
| 5,037,141 | A | 8/1991 | Jardine |
| 5,039,137 | A | 8/1991 | Cankovic et al. |
| 5,056,833 | A | 10/1991 | Webb et al. |
| 5,058,931 | A | 10/1991 | Bowsher |
| 5,080,400 | A | 1/1992 | Adamek et al. |
| 5,094,492 | A | 3/1992 | Levivier |
| 5,104,153 | A | 4/1992 | Corcoran |
| 5,137,305 | A | 8/1992 | Straub |
| 5,190,324 | A | 3/1993 | Bird et al. |
| 5,203,594 | A | 4/1993 | Straub |
| 5,230,537 | A | 7/1993 | Newman |
| 5,230,540 | A | 7/1993 | Lewis et al. |
| 5,240,294 | A | 8/1993 | Corcoran |
| 5,246,256 | A | 9/1993 | Rung et al. |
| 5,246,257 | A | 9/1993 | Kojima et al. |
| 5,248,169 | A | 9/1993 | Barbe et al. |
| 5,249,829 | A | 10/1993 | Hendrickson |
| 5,273,322 | A | 12/1993 | Straub |
| 5,280,969 | A | 1/1994 | Straub |
| 5,280,970 | A | 1/1994 | Straub |
| 5,291,769 | A | 3/1994 | Miyano |
| 5,301,986 | A | 4/1994 | Yehezkeli |
| 5,306,021 | A | 4/1994 | Morvant |
| 5,312,137 | A | 5/1994 | Nee |
| 5,351,997 | A | 10/1994 | Webb et al. |
| 5,354,108 | A | 10/1994 | Sandor |
| 5,387,017 | A | 2/1995 | Gill |
| 5,450,738 | A | 9/1995 | Chatterley et al. |
| 5,508,931 | A | 4/1996 | Snider |
| 5,509,702 | A | 4/1996 | Warehime et al. |
| 5,560,656 | A | 10/1996 | Okamura et al. |
| 5,603,508 | A | 2/1997 | Dole et al. |
| 5,651,588 | A | 7/1997 | Kato |
| 5,658,021 | A | 8/1997 | Matsumoto et al. |
| 5,697,650 | A | 12/1997 | Brown |
| 5,758,906 | A | 6/1998 | Carlstrom et al. |
| 5,758,907 | A * | 6/1998 | Dole et al. ............... 285/112 |
| 5,772,257 | A | 6/1998 | Webb et al. |
| 5,778,715 | A | 7/1998 | Lippka et al. |

(56) References Cited

U.S. PATENT DOCUMENTS

| | | | | |
|---|---|---|---|---|
| 5,845,384 | A | 12/1998 | Retzbach | |
| 5,873,611 | A | 2/1999 | Munley et al. | |
| 5,899,507 | A | 5/1999 | Schroeder et al. | |
| 5,901,601 | A | 5/1999 | Fujimoto et al. | |
| 5,911,446 | A | 6/1999 | McLennan et al. | |
| 5,971,001 | A | 10/1999 | Andersson | |
| 6,070,911 | A | 6/2000 | Namikawa et al. | |
| 6,070,914 | A | 6/2000 | Schmidt | |
| 6,076,861 | A | 6/2000 | Ikeda | |
| 6,139,069 | A | 10/2000 | Radzik | |
| 6,142,536 | A | 11/2000 | Wolfsdorf | |
| 6,170,884 | B1 | 1/2001 | McLennan et al. | |
| 6,171,039 | B1 | 1/2001 | Seurujarvi | |
| 6,206,434 | B1 | 3/2001 | Schreiter | |
| 6,227,577 | B1 | 5/2001 | Ikeda et al. | |
| 6,231,286 | B1 | 5/2001 | Bogatz et al. | |
| 6,302,450 | B1* | 10/2001 | Dole et al. | 285/328 |
| 6,305,719 | B1 | 10/2001 | Smith, Jr. et al. | |
| 6,312,025 | B1 | 11/2001 | Wolfsdorf | |
| 6,328,352 | B1 | 12/2001 | Geppert et al. | |
| 6,361,085 | B2 | 3/2002 | Nguyen | |
| 6,367,843 | B1 | 4/2002 | Fetzer | |
| 6,371,491 | B1* | 4/2002 | Schultz et al. | 277/627 |
| 6,393,885 | B1 | 5/2002 | Cadena | |
| 6,481,762 | B1 | 11/2002 | Rex et al. | |
| 6,502,865 | B1 | 1/2003 | Steele | |
| 6,533,333 | B1 | 3/2003 | Radzik | |
| 6,565,129 | B2 | 5/2003 | Surjaatmadja | |
| 6,581,977 | B1 | 6/2003 | Dole et al. | |
| 6,619,094 | B2 | 9/2003 | Juhl | |
| 6,626,466 | B1 | 9/2003 | Dole | |
| 6,749,232 | B2 | 6/2004 | Wachter et al. | |
| 6,758,500 | B2 | 7/2004 | Lehnhardt | |
| 6,758,501 | B2 | 7/2004 | Amedure et al. | |
| 6,769,697 | B1 | 8/2004 | Ishikawa et al. | |
| 6,834,892 | B2 | 12/2004 | Kornau et al. | |
| 6,880,859 | B2 | 4/2005 | Breay et al. | |
| 6,908,123 | B2 | 6/2005 | Le | |
| 6,969,094 | B2 | 11/2005 | Frohling et al. | |
| D526,705 | S | 8/2006 | Wortmann et al. | |
| 7,086,131 | B2 | 8/2006 | Gibb et al. | |
| 7,090,259 | B2 | 8/2006 | Dole | |
| 7,118,317 | B2 | 10/2006 | Hofschneider | |
| 7,243,955 | B2 | 7/2007 | Krausz et al. | |
| 7,341,287 | B2 | 3/2008 | Gibb et al. | |
| D570,458 | S | 6/2008 | Gibb et al. | |
| 7,401,819 | B2 | 7/2008 | Gibb et al. | |
| 7,533,910 | B2 | 5/2009 | Ma et al. | |
| D598,988 | S | 8/2009 | Jaccoby | |
| D600,325 | S | 9/2009 | Porter et al. | |
| 7,591,055 | B2 | 9/2009 | Gibb et al. | |
| D605,736 | S | 12/2009 | Porter et al. | |
| D609,312 | S | 2/2010 | Porter et al. | |
| 7,654,587 | B2 | 2/2010 | Gibb et al. | |
| D611,126 | S | 3/2010 | Porter et al. | |
| D614,272 | S | 4/2010 | Henry et al. | |
| 7,690,698 | B1 | 4/2010 | Curran | |
| D616,532 | S | 5/2010 | Madara et al. | |
| 7,712,796 | B2 | 5/2010 | Gibb et al. | |
| 7,722,087 | B2 | 5/2010 | Dole et al. | |
| D618,312 | S | 6/2010 | Madara et al. | |
| D618,313 | S | 6/2010 | Madara et al. | |
| D618,314 | S | 6/2010 | Bowman et al. | |
| D618,315 | S | 6/2010 | Bowman et al. | |
| 7,726,703 | B2 | 6/2010 | Porter et al. | |
| 7,789,434 | B2* | 9/2010 | Nagle et al. | 285/367 |
| D625,785 | S | 10/2010 | Madara et al. | |
| D625,786 | S | 10/2010 | Bowman et al. | |
| D625,787 | S | 10/2010 | Bowman et al. | |
| D625,788 | S | 10/2010 | Madara et al. | |
| D626,201 | S | 10/2010 | Madara et al. | |
| 7,818,869 | B2 | 10/2010 | Dole et al. | |
| D629,078 | S | 12/2010 | Dole et al. | |
| D629,079 | S | 12/2010 | Dole et al. | |
| D629,080 | S | 12/2010 | Dole et al. | |
| D629,081 | S | 12/2010 | Dole et al. | |
| D629,496 | S | 12/2010 | Madara et al. | |
| D633,991 | S | 3/2011 | Nakagawa | |
| 7,921,536 | B2 | 4/2011 | Dole | |
| 7,950,701 | B2 | 5/2011 | Dole et al. | |
| D643,912 | S | 8/2011 | Bowman et al. | |
| D646,764 | S | 10/2011 | Rusconi | |
| 8,038,176 | B2 | 10/2011 | Bowman et al. | |
| D648,427 | S | 11/2011 | Bowman et al. | |
| D651,290 | S | 12/2011 | Shah et al. | |
| 8,069,547 | B2 | 12/2011 | Gibb et al. | |
| 8,079,129 | B2 | 12/2011 | Gibb et al. | |
| 8,136,847 | B2 | 3/2012 | Madara et al. | |
| 8,177,263 | B2 | 5/2012 | Dole et al. | |
| D665,056 | S | 8/2012 | Cuvo et al. | |
| D665,057 | S | 8/2012 | Madara et al. | |
| D665,058 | S | 8/2012 | Cuvo et al. | |
| D665,059 | S | 8/2012 | Madara et al. | |
| D665,060 | S | 8/2012 | Wilk, Jr. et al. | |
| D665,061 | S | 8/2012 | Dole et al. | |
| D665,888 | S | 8/2012 | Wilk, Jr. et al. | |
| D665,889 | S | 8/2012 | Dole et al. | |
| 8,267,432 | B2* | 9/2012 | Madara et al. | 285/112 |
| 8,282,136 | B2 | 10/2012 | Vandal et al. | |
| 8,312,616 | B2 | 11/2012 | Dole et al. | |
| D680,629 | S | 4/2013 | Beagen, Jr. | |
| D680,630 | S | 4/2013 | Beagen, Jr. | |
| 8,424,918 | B2 | 4/2013 | Gibb et al. | |
| 8,550,502 | B2 | 10/2013 | Vandal et al. | |
| D696,751 | S | 12/2013 | Beagen, Jr. | |
| 8,615,865 | B2 | 12/2013 | Vandal et al. | |
| 8,819,914 | B2 | 9/2014 | Porter et al. | |
| 9,039,046 | B2 | 5/2015 | Beagen, Jr. | |
| 2002/0171244 | A1 | 11/2002 | Wachter et al. | |
| 2002/0195820 | A1 | 12/2002 | Surjaatmadja | |
| 2003/0062718 | A1 | 4/2003 | Radzik | |
| 2003/0178850 | A1 | 9/2003 | Dole et al. | |
| 2003/0234541 | A1 | 12/2003 | Thompson | |
| 2004/0036291 | A1* | 2/2004 | Dole | 285/367 |
| 2005/0082831 | A1 | 4/2005 | Borland | |
| 2005/0212284 | A1 | 9/2005 | Dole | |
| 2005/0225087 | A1 | 10/2005 | McMahon et al. | |
| 2005/0253380 | A1 | 11/2005 | Gibb et al. | |
| 2005/0253382 | A1 | 11/2005 | Gibb et al. | |
| 2005/0253383 | A1 | 11/2005 | Gibb et al. | |
| 2005/0258641 | A1 | 11/2005 | Gibb | |
| 2007/0040336 | A1 | 2/2007 | Sun et al. | |
| 2007/0090646 | A1 | 4/2007 | Dole et al. | |
| 2008/0007061 | A1 | 1/2008 | Gibb | |
| 2008/0018057 | A1 | 1/2008 | Gibb et al. | |
| 2008/0048444 | A1 | 2/2008 | Porter et al. | |
| 2008/0272595 | A1 | 11/2008 | Gibb et al. | |
| 2008/0290652 | A1 | 11/2008 | Gibb et al. | |
| 2009/0146417 | A1* | 6/2009 | Lippka et al. | 285/112 |
| 2009/0206598 | A1 | 8/2009 | Gibb et al. | |
| 2009/0223031 | A1 | 9/2009 | Gibb et al. | |
| 2009/0243291 | A1 | 10/2009 | Gibb et al. | |
| 2009/0284159 | A1 | 11/2009 | Yang | |
| 2010/0001521 | A1 | 1/2010 | Vandal et al. | |
| 2010/0102549 | A1 | 4/2010 | Radzik | |
| 2010/0148493 | A1 | 6/2010 | Madara et al. | |
| 2010/0187812 | A1 | 7/2010 | Radzik et al. | |
| 2010/0218362 | A1 | 9/2010 | Porter et al. | |
| 2010/0289257 | A1 | 11/2010 | Madara et al. | |
| 2010/0320756 | A1 | 12/2010 | Gibb et al. | |
| 2011/0037250 | A1 | 2/2011 | Bowman et al. | |
| 2011/0062706 | A1 | 3/2011 | Henry | |
| 2011/0133415 | A1 | 6/2011 | Vu | |
| 2011/0154646 | A1 | 6/2011 | Hagiya | |
| 2012/0139236 | A1 | 6/2012 | Novitsky et al. | |
| 2012/0235405 | A1 | 9/2012 | Dole et al. | |
| 2012/0248767 | A1 | 10/2012 | Lippka | |
| 2012/0256415 | A1 | 10/2012 | Dole | |
| 2012/0256416 | A1 | 10/2012 | Ikeda et al. | |
| 2012/0280494 | A1 | 11/2012 | Vandal et al. | |
| 2013/0185919 | A1* | 7/2013 | Beagen, Jr. | 29/525.02 |
| 2013/0187345 | A1 | 7/2013 | Beagen, Jr. | |

(56) References Cited

U.S. PATENT DOCUMENTS

| | | | |
|---|---|---|---|
| 2013/0187346 | A1 | 7/2013 | Beagen, Jr. |
| 2013/0187379 | A1* | 7/2013 | Beagen, Jr. .................. 285/337 |

FOREIGN PATENT DOCUMENTS

| | | |
|---|---|---|
| DE | 972484 | 7/1959 |
| DE | 1205348 | 11/1965 |
| DE | 1798281 | 9/1971 |
| DE | 2911575 | 9/1980 |
| DE | 2950521 | 10/1980 |
| DE | 3038491 | 4/1982 |
| DE | 9103296 | 6/1991 |
| DE | 4309330 | 9/1994 |
| DE | 4427513 | 2/1996 |
| DE | 19534437 | 3/1997 |
| DE | 10006029 | 8/2001 |
| DE | 10230845 | 2/2003 |
| DK | 108514 | 12/1967 |
| EP | 0079457 | 5/1983 |
| EP | 0178360 | 4/1986 |
| EP | 0205896 | 12/1986 |
| EP | 0360946 | 4/1990 |
| EP | 0361765 | 4/1990 |
| EP | 0386516 | 9/1990 |
| EP | 396151 | 11/1990 |
| EP | 0412642 | 2/1991 |
| EP | 412642 | 2/1991 |
| EP | 0427880 | 5/1991 |
| EP | 0463424 | 1/1992 |
| EP | 0531833 | 3/1993 |
| EP | 1180630 | 2/2002 |
| EP | 1260751 | 11/2002 |
| ES | 2172374 | 9/2002 |
| FR | 1138312 | 6/1957 |
| FR | 2761452 | 10/1998 |
| GB | 343781 | 2/1931 |
| GB | 458441 | 12/1936 |
| GB | 822025 | 10/1959 |
| GB | 1322269 | 7/1973 |
| GB | 1331236 | 9/1973 |
| GB | 1489488 | 10/1977 |
| GB | 2051213 | 1/1981 |
| GB | 2098297 | 11/1982 |
| GB | 2123904 | 2/1984 |
| GB | 2143294 | 2/1985 |
| GB | 2157785 | 10/1985 |
| GB | 2161882 | 1/1986 |
| GB | 2211255 | 6/1989 |
| GB | 2218768 | 11/1989 |
| GB | 2243659 | 11/1991 |
| GB | 2253451 | 9/1992 |
| GB | 2253452 | 9/1992 |
| GB | 1019322 | 2/1996 |
| GB | 2349189 | 10/2000 |
| GB | 2367871 | 4/2002 |
| JP | H427287 | 6/1990 |
| JP | H4117978 | 4/1991 |
| JP | H1154390 | 2/1999 |
| JP | 2000257767 | 9/2000 |
| JP | 2003074772 | 3/2003 |
| JP | 20077278455 | 10/2007 |
| KR | 1019980012486 | 4/1998 |
| KR | 1020050121743 | 12/2005 |
| SE | 8704187 | 4/1989 |
| WO | 9317268 | 9/1993 |
| WO | 9511402 | 4/1995 |
| WO | 9843010 | 10/1998 |
| WO | 0057093 | 9/2000 |
| WO | 0077435 | 12/2000 |
| WO | 0159350 | 8/2001 |
| WO | 03029712 | 4/2003 |
| WO | 2005114024 | 12/2005 |
| WO | 2007145995 | 12/2007 |
| WO | 2008104792 | 4/2008 |

OTHER PUBLICATIONS

Gibb, John; Request for Inter Partes Reexamination under U.S. Appl. No. 95/001,878, filed Jan. 27, 2012; 36 pages.
Gibb, John; Request for Inter Partes Reexamination under U.S. Appl. No. 95/001,880, filed Feb. 1, 2012; 271 pages.
Vandal; International Search Report and Written Opinion for serial No. PCT/US09/48291, filed Jun. 23, 2009, mailed Apr. 2, 2010; 11 pages.
Vandal, Peter; Office Action from Canadian Intellectual Property Office for Application No. 2,732,427, filed Jun. 25, 2009, mailed Jul. 5, 2012; 4 pgs.
Gibb, John; Request for Ex Parte Reexamination under U.S. Appl. No. 90/012,656, filed Sep. 14, 2012; 143 pages.
Gibb, John; Request for Inter Partes Reexamination under U.S. Appl. No. 95/002,401, filed Sep. 15, 2012; 147 pages.
Gibb, John; Request for Inter Partes Reexamination under U.S. Appl. No. 95/002,410, filed Sep. 15, 2012; 85 pages.
Vandal, Peter Joseph; Canadian Office Action for serial No. 2,732,427, filed Jun. 25, 2009, mailed Jul. 18, 2013, 3 pgs.
http://web.archive.org/web/20061224052824/http://www.romacindustries.com/XR501.html; published on Dec. 24, 2006, 2 pgs.
http://web.archive.org/web/20061024140046/http://www.romacindustries.com/Installation-instructions/XR501-install.pdf; published on Oct. 24, 2006, 2 pgs.
Vandal, Peter Joseph; Issue Notification for U.S. Appl. No. 12/490,113, filed Jun. 23, 2009, mailed Sep. 19, 2012; 1 pg.
Vandal, Peter Joseph; Non-Final Office Action for U.S. Appl. No. 12/490,113, filed Jun. 23, 2009, mailed Dec. 8, 2011, 13 pages.
Vandal, Peter Joseph; Notice of Allowance for U.S. Appl. No. 12/490,113, filed Jun. 23, 2009, mailed Feb. 29, 2012; 39 pgs.
Vandal, Peter Joseph; Notice of Allowance for U.S. Appl. No. 12/490,113, filed Jun. 23, 2009, mailed Apr. 16, 2012; 6 pgs.
Vandal, Peter Joseph; Notice of Allowance for U.S. Appl. No. 12/490,113, filed Jun. 23, 2009, mailed May 31, 2012; 9 pgs.
Vandal, Peter Joseph; Restriction Requirement for U.S. Appl. No. 12/490,113, filed Jun. 23, 2009, mailed Oct. 26, 2011; 5 pgs.
Vandal, Peter Joseph; U.S. Patent Application Entitled: Slip on Groove Coupling with Multiple Sealing Gasket; U.S. Appl. No. 12/490,113, filed Jun. 23, 2009; 33 pgs.
Vandal, Peter Joseph; Non-Final Office Action for U.S. Appl. No. 13/554,721, filed Jul. 20, 2012, mailed Feb. 5, 2013; 54 pgs.
Vandal, Peter Joseph; Notice of Allowance for U.S. Appl. No. 13/554,721, filed Jul. 20, 2012, mailed Aug. 6, 2013, 18 pgs.
Vandal, Peter Joseph; U.S. Patent Application entitled: Slip on Groove Coupling with Multiple Sealing Gasket, having U.S. Appl. No. 13/554,721, filed Jul. 20, 2012, 29 pgs.
Vandal, Peter Jospeh; Issue Notification for U.S. Appl. No. 13/554,721, filed Jul. 20, 2012, mailed Sep. 18, 2013, 1 pg.
Vandal, Peter Joseph; Advisory Action for U.S. Appl. No. 14/019,182, filed Sep. 5, 2013, mailed Jun. 23, 2014, 3 pgs.
Vandal, Peter Joseph; Final Office Action for U.S. Appl. No. 14/019,182, filed Sep. 5, 2013, mailed Apr. 8, 2014, 28 pgs.
Vandal, Peter Joseph; Final Office Action for U.S. Appl. No. 14/019,182, filed Sep. 5, 2013, mailed Jul. 11, 2014, 11 pgs.
Vandal, Peter Joseph; Non-Final Office Action for U.S. Appl. No. 14/019,182, filed Sep. 5, 2013, mailed Nov. 12, 2013, 54 pgs.
Vandal, Peter Joseph; U.S. Patent Application entitled: Slip on Groove Coupling with Multiple Sealing Gasket, having U.S. Appl. No. 14/019,182, filed Sep. 5, 2013, 29 pgs.
Vandal, Peter Joseph; U.S. Divisional Patent Application entitled: Slip on Groove Coupling With Multiple Sealing Gasket filed under U.S. Appl. No. 13/300,718, filed Nov. 21, 2011, 29 pgs.
Vandal, Peter Joseph; Issue Notification for U.S. Appl. No. 13/300,718, filed Nov. 21, 2011, mailed Dec. 11, 2013, 1 pg.
Vandal, Peter Joseph; Non-Final Office Action for U.S. Appl. No. 13/300,718, filed Nov. 21, 2011, mailed May 30, 2013; 59 pgs.
Vandal, Peter Joseph; Notice of Allowance for U.S. Appl. No. 13/300,718, filed Nov. 21, 2011, mailed; Oct. 15, 2013; 14 pgs.
Vandal, Peter Joseph; Non-Final Office Action for U.S. Appl. No. 14/088,865, filed Nov. 25, 2013, mailed Aug. 14, 2014, 69 pgs.

(56) References Cited

OTHER PUBLICATIONS

Vandal, Peter Joseph; US Patent Application entitled: Slip on Groove Coupling With Multiple Sealing Gasket, U.S. Appl. No. 14/088,865, filed Nov. 25, 2013; 29 pgs.
Vandal, Peter Joseph; International Preliminary Report on Patentability for U.S. Appl. No. PCT/US/09/48637, filed Jun. 25, 2009, mailed Jan. 5, 2011; 9 pgs.
Vandal, Peter Joseph; PCT Application Entitled: Slip on Groove Coupling with Multiple Sealing Gasket; Serial No. PCT/US09/48637, filed Jun. 25, 2009; 33 pages.
Vandal, Peter Joseph; U.S. Provisional Patent Application Entitled: Slip on Groove Coupling with Multiple Sealing Gasket, U.S. Appl. No. 61/133,300, filed Jun. 30, 2008; 9 pages.
Beagen Jr., Joseph William; U.S. Patent Application Entitled: Slip-on Coupling; U.S. Appl. No. 13/354,459, filed Jan. 20, 2012; 33 pages.
Beagen Jr., Joseph William; U.S. Patent Application Entitled: Coupling with Tongue and Groove; U.S. Appl. No. 13/354,464, filed Jan. 20, 2012; 32 pages.
Beagen, Jr., Joseph William; Restriction Requirement for U.S. Appl. No. 13/354,464, filed Jan. 20, 2012, mailed Oct. 4, 2013, 6 pgs.
Beagen, Jr., Joseph William; Final Office Action for U.S. Appl. No. 13/354,464, filed Jan. 20, 2012, mailed Jul. 24, 2014, 20 pgs.
Beagen Jr., Joseph William; U.S. Patent Application Entitled: Coupling Gasket with Multiple Sealing Surfaces; U.S. Appl. No. 13/354,466, filed Jan. 20, 2012; 32 pages.
Beagen, Jr., Joseph William; Non-Final Office Action for U.S. Appl. No. 13/354,466, filed Jan. 20, 2012, mailed Jun. 13, 2014, 84 pgs.
Beagen, Jr., Joseph William; Final Office Action for U.S. Appl. No. 13/354,466, filed Jan. 20, 2012, mailed Sep. 9, 2014, 18 pgs.
Beagen Jr., U.S. Patent Application Entitled: Slip-on Coupling Gasket; U.S. Appl. No. 13/354,470, filed Jan. 20, 2012; 32 pages.
Beagen, Jr., Joseph William; Non-Final Office Action for U.S. Appl. No. 13/354,470, filed Jan. 20, 2012, mailed Jun. 18, 2014, 97 pgs.
Beagan Jr., Notice of Allowance for U.S. Appl. No. 29/406,887, filed Nov. 21, 2011, mailed Dec. 6, 2012; 47 pgs.
Beagen Jr, Joseph William; Supplemental Notice of Allowance for U.S. Appl. No. 29/406,887, filed Nov. 21, 2011, mailed Jan. 10, 2013; 13 pgs.
Beagen Jr., Joseph William; U.S. Patent Application Entitled: Slip-on Pipe Coupling Assembly; U.S. Appl. No. 29/406,887, filed Nov. 21, 2011; 6 pages.
Beagen, Jr., Joseph William; Issue Notification for U.S. Appl. No. 29/406,887, filed Nov. 21, 2011, mailed Apr. 3, 2013, 1 pg.
Beagen, Jr., Joseph William; Supplemental Notice of Allowance for U.S. Appl. No. 29/406,887, filed Nov. 21, 2011, mailed Mar. 14, 2013, 6 pgs.
Beagan Jr., Joseph William; Issue Notification for U.S. Appl. No. 29/405,039, filed Oct. 27, 2011, mailed Dec. 11, 2013, 1 pg.
Beagan, Jr., Joseph William; Notice of Allowance for U.S. Appl. No. 29/405,039, filed Oct. 27, 2011, mailed Oct. 2, 2013, 68 pgs.
Beagen Jr., Joseph William; U.S. Patent Application Entitled: Slip-on Gasket; U.S. Appl. No. 29/405,039, filed Oct. 27, 2011; 3 pages.
Beagan Jr., Joseph William; Notice of Allowance for U.S. Appl. No. 29/406,886, filed Nov. 21, 2011, mailed Dec. 6, 2012; 47 pgs.
Beagen Jr, Joseph William; Supplemental Notice of Allowance for U.S. Appl. No. 29/406,886, filed Nov. 21, 2011, mailed Jan. 11, 2013; 13 pgs.
Beagen Jr, Joseph William; Supplemental Notice of Allowance for U.S. Appl. No. 29/406,886, filed Nov. 21, 2011, mailed Feb. 28, 2013; 6 pgs.
Beagen Jr., Joseph William; U.S. Patent Application Entitled: Slip-On Coupling Segment, U.S. Appl. No. 29/406,886, filed Nov. 21, 2011; 5 pgs.
Beagen, Jr., Joseph William; Issue Notification for U.S. Appl. No. 29/406,886, filed Nov. 21, 2011, mailed Apr. 3, 2013, 1 pg.
Vandal; U.S. Patent Application Entitled: Slip on Groove Coupling with Multiple Sealing Gasket; U.S. Appl. No. 12/490,113, filed Jun. 23, 2009; 33 pgs.
Vandal, et al.; U.S. Divisional Patent Application entitled: Slip on Groove Coupling With Multiple Sealing Gasket filed under U.S. Appl. No. 13/300,718, filed Nov. 21, 2011, 29 pgs.
Vandal; International Preliminary Report on Patentability for U.S. Appl. No. PCT/US/09/48637, filed Jun. 25, 2009, mailed Jan. 5, 2011; 9 pgs.
Vandal; PCT Application Entitled: Slip on Groove Coupling with Multiple Sealing Gasket; Serial No. PCT/US09/48637, filed Jun. 25, 2009; 33 pages.
Vandal; U.S. Provisional Patent Application Entitled: Slip on Groove Coupling with Multiple Sealing Gasket, U.S. Appl. No. 61/133,300, filed Jun. 30, 2008; 9 pages.
Beagen Jr.; U.S. Patent Application Entitled: Slip-on Coupling; U.S. Appl. No. 13/354,459, filed Jan. 20, 2012; 33 pages.
Beagen Jr.; U.S. Patent Application Entitled: Coupling with Tongue and Groove; U.S. Appl. No. 13/354,464, filed Jan. 20, 2012; 32 pages.
Beagen Jr.; U.S. Patent Application Entitled: Coupling Gasket with Multiple Sealing Surfaces; U.S. Appl. No. 13/354,466, filed Jan. 20, 2012; 32 pages.
Beagen Jr.; U.S. Patent Application Entitled: Slip-on Coupling Gasket; U.S. Appl. No. 13/354,470, filed Jan. 20, 2012; 32 pages.
Beagen Jr.; U.S. Patent Application Entitled: Slip-on Pipe Coupling Assembly; U.S. Appl. No. 29/406,887, filed Nov. 21, 2011; 6 pages.
Beagen Jr.; U.S. Patent Application Entitled: Slip-on Gasket; U.S. Appl. No. 29/405,039, filed Oct. 27, 2011; 3 pages.
Vandal, Peter Joseph; Final Office Action for U.S. Appl. No. 14/019,182, filed Sep. 15, 2013, mailed Oct. 24, 2014, 11 pgs.
Vandal, Peter Joseph; Final Office Action for U.S. Appl. No. 14/088,865, filed Nov. 25, 2013, mailed Nov. 24, 2014, 11 pgs.
Beagen Jr., Joseph W.; Restriction Requirement for U.S. Appl. No. 13/354,459, filed Jan. 20, 2012, mailed Oct. 31, 2014, 7 pgs.
Beagen, Joseph William Jr.; Final Office Action for U.S. Appl. No. 13/354,464, filed Jan. 20, 2012, mailed Oct. 15, 2014, 13 pgs.
Beagen Jr., Joseph W.; U.S. Patent Application entitled: Coupling With Tongue and Groove, U.S. Appl. No. 14/506,307, filed Oct. 3, 2014, 33 pgs.
Beagen Jr., Joseph William; Non-Final Office Action for U.S. Appl. No. 13/354,466, filed Jan. 20, 2012, mailed Dec. 17, 2014, 12 pgs.
Beagen Jr., Joseph William; Final Office Action for U.S. Appl. No. 13/354,470, filed Jan. 20, 2012, mailed Dec. 17, 2014, 20 pgs.
Beagen Jr., Joseph William; Issue Notification for U.S. Appl. No. 13/354,464, filed Jan. 20, 2012, mailed May 6, 2015, 1 pg.
Beagen Jr., Joseph William; Final Office Action for U.S. Appl. No. 13/354,466, filed Jan. 20, 2012, mailed Apr. 7, 2015, 21 pgs.
Beagen Jr., Joseph William; Non-Final Office Action for U.S. Appl. No. 13/354,470, filed Jan. 20, 2012, mailed Apr. 8, 2015, 16 pgs.
Beagen Jr., Joseph William; Non-Final Office Action for U.S. Appl. No. 13/354,459, filed Jan. 20, 2012, mailed Jan. 27, 2015, 71 pgs.
Beagen Jr., Joseph William; Notice of Allowance for U.S. Appl. No. 13/354,464, filed Jan. 20, 2012, mailed Feb. 2, 2015, 9 pgs.
Vandal, Peter Joseph; Non-Final Office Action for U.S. Appl. No. 14/019,182, filed Sep. 5, 2013, mailed Mar. 23, 2015, 12 pgs.
Vandal, Peter Joseph; Notice of Allowance for U.S. Appl. No. 14/019,182, filed Sep. 5, 2013, mailed Jun. 1, 2015, 10 pgs.
Vandal, Peter Joseph; Non-Final Office Action for U.S. Appl. No. 14/677,507, filed Apr. 2, 2015, mailed Jul. 30, 2015, 73 pgs.
Vandal, Peter Joseph; Examiner's Answer to Appeal Brief for U.S. Appl. No. 14/088,865, filed Nov. 25, 2013, mailed Jun. 24, 2015, 24 pgs.
Beagen Jr., Joseph William; Final Office Action for U.S. Appl. No. 13/354,459, filed Jan. 20, 2012, mailed Jun. 3, 2015, 16pgs.
Beagen, Joseph William; U.S. Divisional Patent Application entitled: Slip-On Coupling having U.S. Appl. No. 14/741,665, filed Jun. 17, 2015, 33 pgs.
Beagen Jr., Joseph William; Non-Final Office Action for U.S. Appl. No. 13/354,466, filed Jan. 20, 2012, mailed Jul. 30, 2015, 18 pgs.
Vandal, Peter Joseph; U.S. Continuation Application entitled: (ANVIL) Slip On Groove Coupling With Multiple Sealing Gasket having U.S Appl. No. 14/837,475, filed Aug. 27, 2015, 29 pgs.
Beagen Jr., Joseph William; Final Office Action for U.S. Appl. No. 13/354,470, filed Aug. 11, 2015, 28 pgs.
Schell, Ty; U.S. Divisional Application entitled: Coupling With Extending Parting Line having U.S. Appl. No. 14/848,641, filed Sep. 9, 2015, 30 pgs.

* cited by examiner

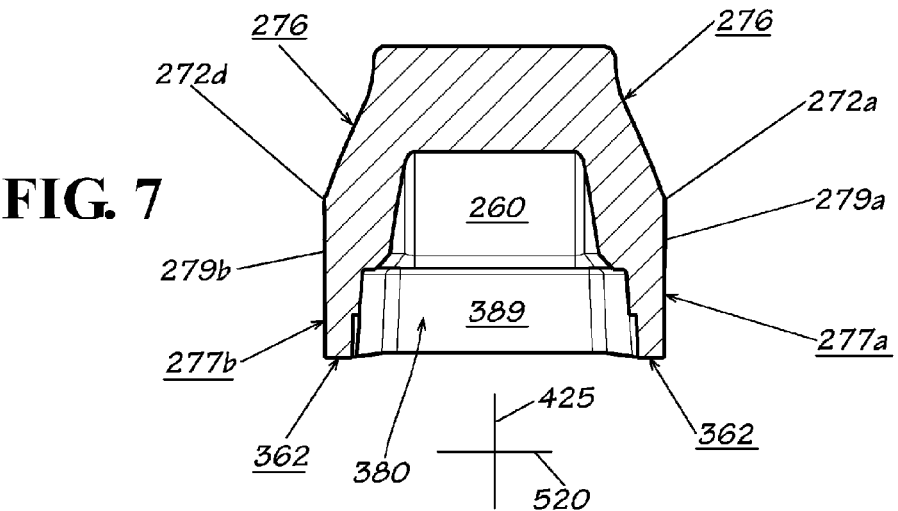
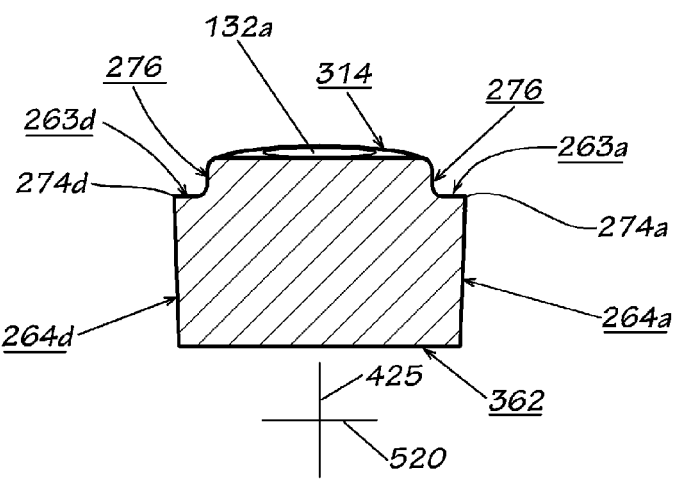
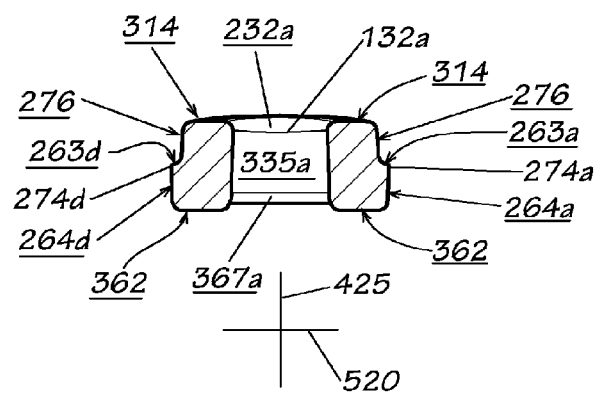

US 9,168,585 B2

COUPLING WITH EXTENDING PARTING LINE

TECHNICAL FIELD

This disclosure relates to piping. More specifically, this disclosure relates to pipe couplings.

BACKGROUND

Pipe elements such as pipes, valves, and meters typically are not made of one piece. Rather, such pipe elements are formed in finite lengths and are joined. One way of joining such pipe elements is through the use of a coupling member. A sealing gasket is typically disposed in a coupling void of at least one coupling segment which is thereafter tightened around the pipe elements to be joined. The coupling member typically includes at least one coupling segment. The coupling segment may be formed by casting, a manufacturing process in which material is poured as a liquid into a cavity in a mold in the shape of the coupling segment. The material solidifies within the mold, and the formed coupling segment is then removed from the mold.

SUMMARY

Disclosed is a pipe coupling including at least one coupling segment, each segment including an outer surface, an inner surface, at least two ends, fastener pads protruding proximate to each end, and a parting line extending around each segment, the parting line forming an axially outermost edge along each axial side of each coupling segment, the parting line offset from a top surface of each fastener pad.

Also disclosed is a coupling segment including an outer surface, an inner surface, at least two ends, fastener pads protruding proximate to each end, each fastener pad including an axially outermost edge offset from a top surface of each fastener pad, and a tongue extending from one of the at least two ends.

Also disclosed is a method of manufacturing a coupling segment including obtaining a mold having an interior and an exterior, the interior defining an interior surface, the interior surface defining a cavity, the cavity including a border line at an outermost edge of the cavity; placing a material in liquid form into the cavity in the mold; and removing a coupling segment from the mold, the coupling segment formed from the material, the coupling segment including an outer surface, an inner surface, at least two ends, fastener pads protruding proximate to each end, and a parting line extending along the border line of the cavity of the mold prior to removal of the coupling segment from the mold, the parting line offset from a top surface of each fastener pad.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 7 is a cross-sectional view of the segment of FIG. 2 taken along line C-C shown in FIG. 4.

FIG. 8 is a cross-sectional view of the segment of FIG. 2 taken along line B-B shown in FIG. 4.

FIG. 9 is a cross-sectional view of the segment of FIG. 2 taken along line A-A shown in FIG. 4.

DETAILED DESCRIPTION

Disclosed is a pipe coupling and associated methods, systems, devices, and various apparatus. The pipe coupling includes at least one segment. It would be understood by one of skill in the art that the disclosed pipe coupling is described in but a few exemplary embodiments among many. No particular terminology or description should be considered limiting on the disclosure or the scope of any claims issuing therefrom.

Figure 1:
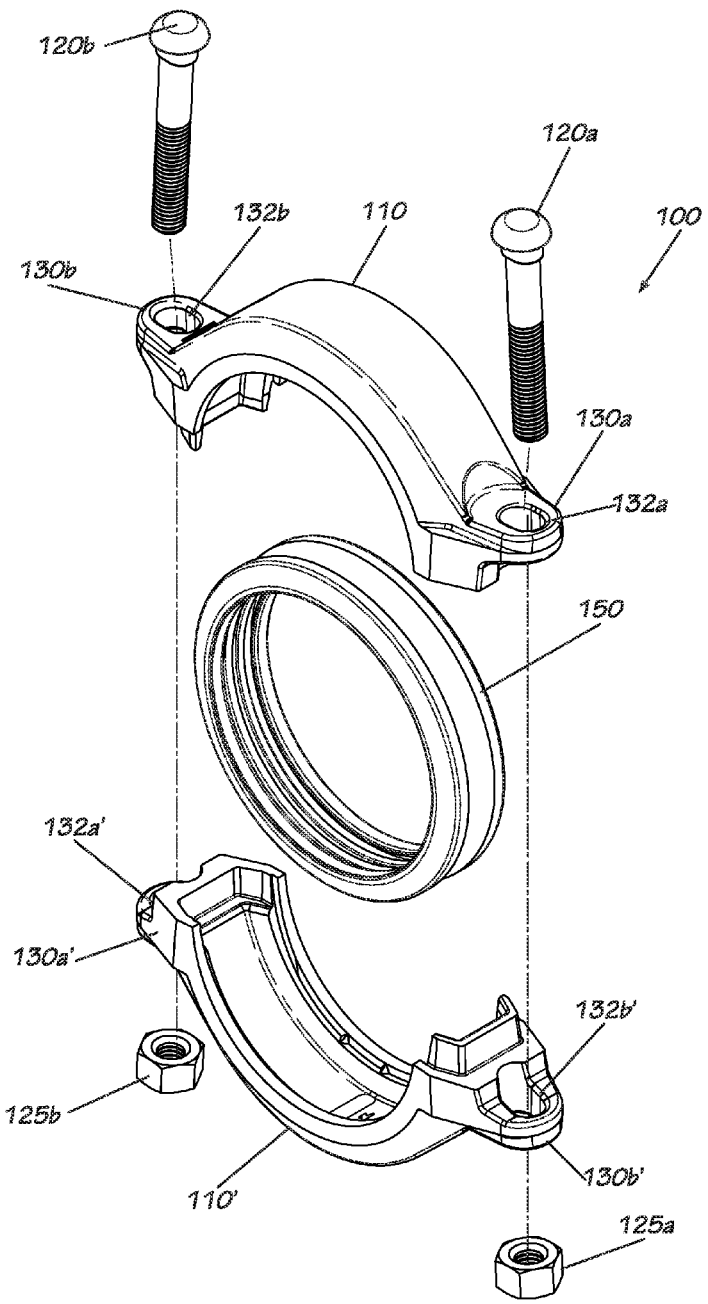
FIG. 1 is an exploded perspective view of a coupling in accord with one embodiment of the current disclosure.

One embodiment of a pipe coupling 100 is disclosed and described in FIG. 1. The pipe coupling 100 of the current embodiment includes two segments 110,110' although any number of segments 110 may be used in various embodiments. The current embodiment includes tightening elements or fasteners that are nut and bolt fasteners. Two bolts 120$a,b$ are disposed to interact with nuts 125$a,b$ in threaded engagement. Various types of tightening elements may be used in various embodiments, and the disclosure of bolts 120$a,b$, and nuts 125$a,b$ should not be considered limiting. Fastener pads 130$a,b$ protrude from segment 110 and fastener pads 130$a',b'$ protrude from segment 110'. Fastener holes 132$a,b,a',b'$ are defined in fastener pads 130$a,b,a',b'$, respectively. In the current embodiment, the fastener holes 132$a,b,a',b'$ are about centered within the fastener pads 130$a,b,a',b'$, although they may be offset in various embodiments. Although the fastener pads 130$a,b,a',b'$ and fastener holes 132$a,b,a',b'$ are described in the current configuration, various locations and configurations of fastener pads 130$a,b,a',b'$ and fastener holes 132$a,b,$ $a',b'$ are included in various embodiments. A gasket 150 is included with the pipe coupling 100. The gasket 150 of the current embodiment is annular and adapted to surround and to seal fluid piping, although various configurations will be included in various embodiments.

Figure 2:
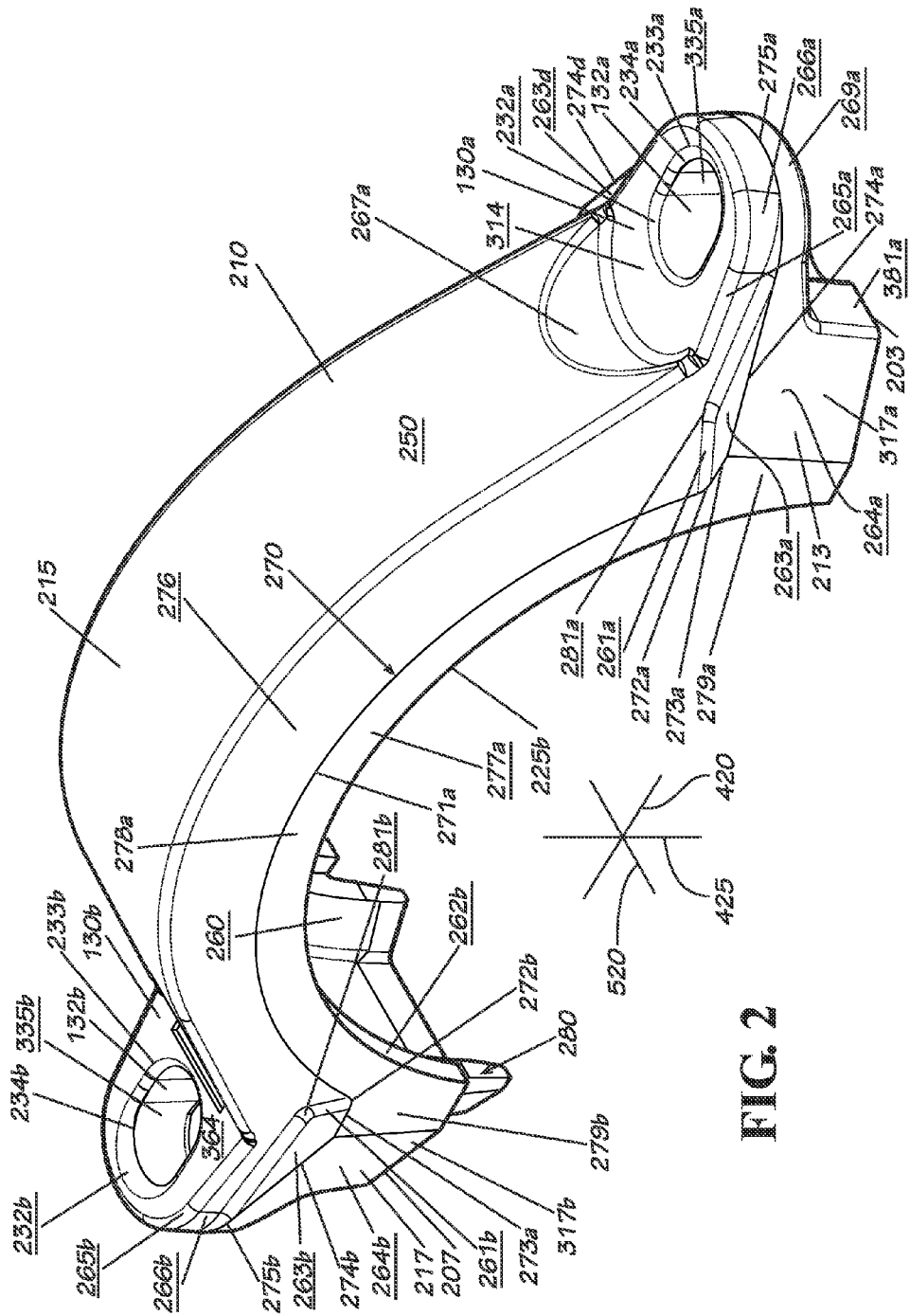
FIG. 2 is an outer perspective view of a segment of the coupling of FIG. 1.

FIGS. 2, 3, 4, and 5 show segment 110. In the current embodiment, segment 110' is substantially identical to segment 110. FIG. 2 shows a horizontal axis 420, a vertical axis 425, and a longitudinal axis 520 of the segment 110. Longitudinal axis 520 is approximately collinear with a longitudinal axis of a pair of pipe elements 710$a,b$ (710$b$ shown in FIG. 11, 710$a$ not shown) about which the segments 110,110' straddle when in use. Longitudinal axis 520 extends in an axial direction along the axis of the pair of pipe elements 710a,b. Horizontal axis 420 and vertical axis 425 are perpendicular to each other and to longitudinal axis 520. As seen in FIG. 2, each segment 110 includes two ends 203,207 and a segment body 210 disposed between the two ends 203,207. Each segment 110 in the current embodiment is about semi-circular, although other configurations may be used in various embodiments. Proximate each end 203,207 is a shoulder 213, 217 protruding outwardly from the segment 110. Each shoulder 213,217 provides a connection point for a fastener which, in the current embodiment, is a bolt 120. Each shoulder 213, 217 includes fastener holes 132a,b defined in fastener pads 130a,b. Each fastener pad 130a,b also includes a top surface 314,364, and a upper pad rim surface 265a,b and defines a cut-out 267a,b (267b shown in FIG. 5) in the segment body 210. Shoulders 213, 217 also include walls 317a,b,c,d (317c,d not shown) along the outside of the shoulders 213, 217, respectively.

Each segment body 210 includes a central portion 215 and at least one edge portion 225b (225a not shown in FIG. 2). In the current embodiment, the edge portions 225a,b are designed to interact with a groove in the pipe elements 710a,b to be sealed and joined, although some embodiments may be designed to interact with non-grooved pipe elements.

As can be seen in FIG. 2, in the current embodiment, each fastener hole 132a,b is ovular in shape, although other embodiments may include various shapes. The shape of the current embodiment of the fastener holes 132a,b provides interference with the bolts 120a,b to reduce rocking motion. Fastener holes 132a,b also include hole inner surfaces 335a,b (335b shown in FIG. 3). The fastener holes 132a,b also include upper hole rim surfaces 232a,b having upper rims 233a,b and lower rims 234a,b. The upper hole rim surfaces 232a,b are rounded to serve as a smooth transition from border top surfaces 314,364 to hole inner surfaces 335a,b. Each segment 110 includes an outer surface 250 and an inner surface 260. Contact surfaces 262a,b (262a shown in FIG. 3) are included on the inside of each edge portion 225a,b. Also seen in FIG. 2 is a tongue 280, as will be described in more detail with reference to FIGS. 3, 4, and 5.

FIG. 2 also shows a parting line 270 extending along the periphery of the segment 110. In the current embodiment, the parting line 270 extends continuously around the fastener pads 130a,b and the segment body 210, as can be seen more clearly in FIG. 5. The parting line 270 includes body line portions 271a,b (271b shown in FIG. 5) extending along the arc of the segment body 210 towards each end 203,207 and into transition line portions 272a,b,c,d (272c,d shown in FIG. 5). The transition line portions 272a,b,c,d are curved in the current embodiment and transition the parting line 270 from the segment body 210 to the shoulders 213,217 and the fastener pads 130a,b and into lateral line portions 273a,b,c,d (273c,d shown in FIG. 5). The lateral line portions 273a,b,c,d extend from the transition line portions 272a,b,c,d to tapering line portions 274a,b,c,d (274d shown in FIG. 5). The tapering line portions 274a,b,c,d extend from the lateral line portions 273a,b,c,d to radiused line portions 275a,b (275b shown in FIG. 3), which extend, respectively, around the ends of the fastener pads 130a,b.

Figure 5:
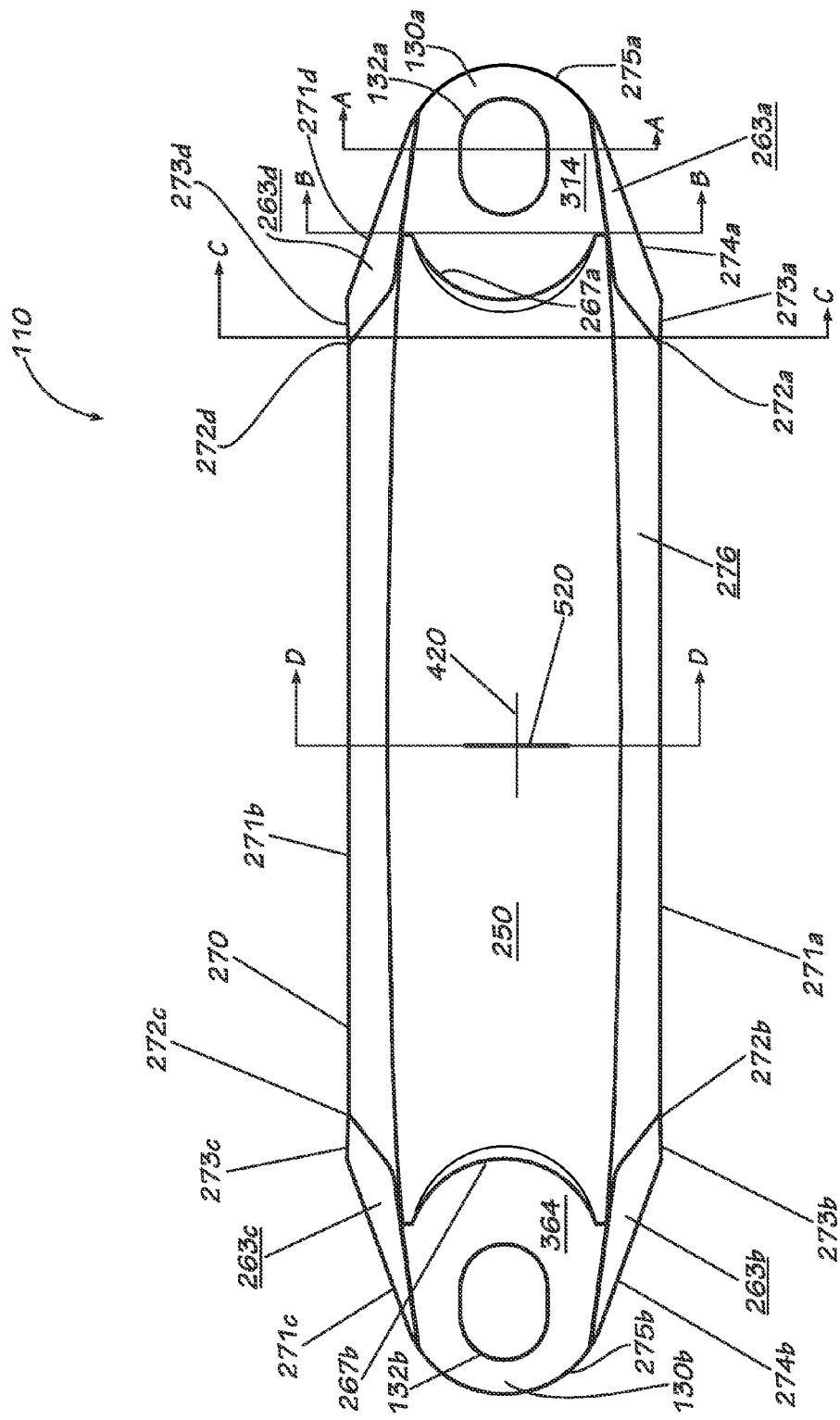
FIG. 5 is a top view of the segment of FIG. 2.

Adjacent to the parting line 270 are surfaces that slope away from the parting line 270 towards surfaces that are inside the boundary around the segment 110 formed by parting line 270 when viewed from the top of the segment 110, as shown in FIG. 5. The surfaces adjacent the parting line 270 may slope approximately toward vertical axis 425. Upper body surface 276 borders body line portions 271a,b and slopes towards outer surface 250. In addition, upper body surface 276 extends around the periphery of the segment 110 and includes upper curved end surfaces 266a,b that curve around the ends of fastener pads 130a,b and border radiused line portions 275a,b and upper pad rim surfaces 265a,b on the fastener pads 130a,b. Lower body surfaces 277a,b (277b not shown) also border body line portions 271a,b as well as transition line portions 272a,b,c,d and lateral line portions 273a,b,c,d and slope towards contact surfaces 262a,b. The lower body surfaces 277a,b include arced surface portions 278a,b (278b shown in FIG. 6) and surface end portions 279a,b,c,d (279d shown in FIG. 7, 279c not shown). Arced surface portions 278a,b border body line portions 271a,b and surface end portions 279a,b,c,d border transition line portions 272a,b,c,d and lateral line portions 273a,b,c,d.

The transition line portions 272a,b,c,d also border curved transition surfaces 261a,b,c,d (261c,d not shown). Curved transition surfaces 261a,b,c,d extend from transition line portions 272a,b,c,d towards fastener pads 130a,b. The curved transition surfaces 261a,b,c,d are bordered by upper body surface 276 and step surfaces 263a,b,c,d (263c shown in FIG. 5) and extend to radiused line portions 275a,b,c,d. Each curved transition surface 261a,b,c,d includes a bend surface 281a,b,c,d (281c,d not shown) that transitions the respective curved transition surface 261a,b,c,d along the border of the step surfaces 263a,b,c,d. The step surfaces 263a,b,c,d also border the lateral line portions 273a,b,c,d and tapering line portions 274a,b,c,d. Tapering line portions 274a,b,c,d and radiused line portions 275a,b also border shoulder end surfaces 264a,b. Shoulder end surfaces 264a,b each extend from surface end portions 279a,b of lower body surface 277a on walls 317a,b and around fastener pads 130a,b to walls 317c,d and terminate at surface end portions 279c,d of lower body surface 277b, respectively. Shoulder end surfaces 264a,b include lower curved end surfaces 269a,b that curve around the ends of fastener pads 130a,b and border radiused line portions 275a,b As seen more clearly in FIG. 3, the tongue 280 protrudes from the end 207 of the segment 110. The shoulder 217 can be seen protruding outwardly from the segment 110. In the current embodiment, the shoulder 217 includes a bottom surface 312. The bottom surface 312 and the top surface 314 are substantially parallel in the current embodiment and are angled in order to ensure proper alignment upon deformable tightening of the pipe coupling 100, as will be discussed later with reference to FIG. 4. However, in some embodiments, the bottom surface 312 and the top surface 314 are not angled.

Figure 3:
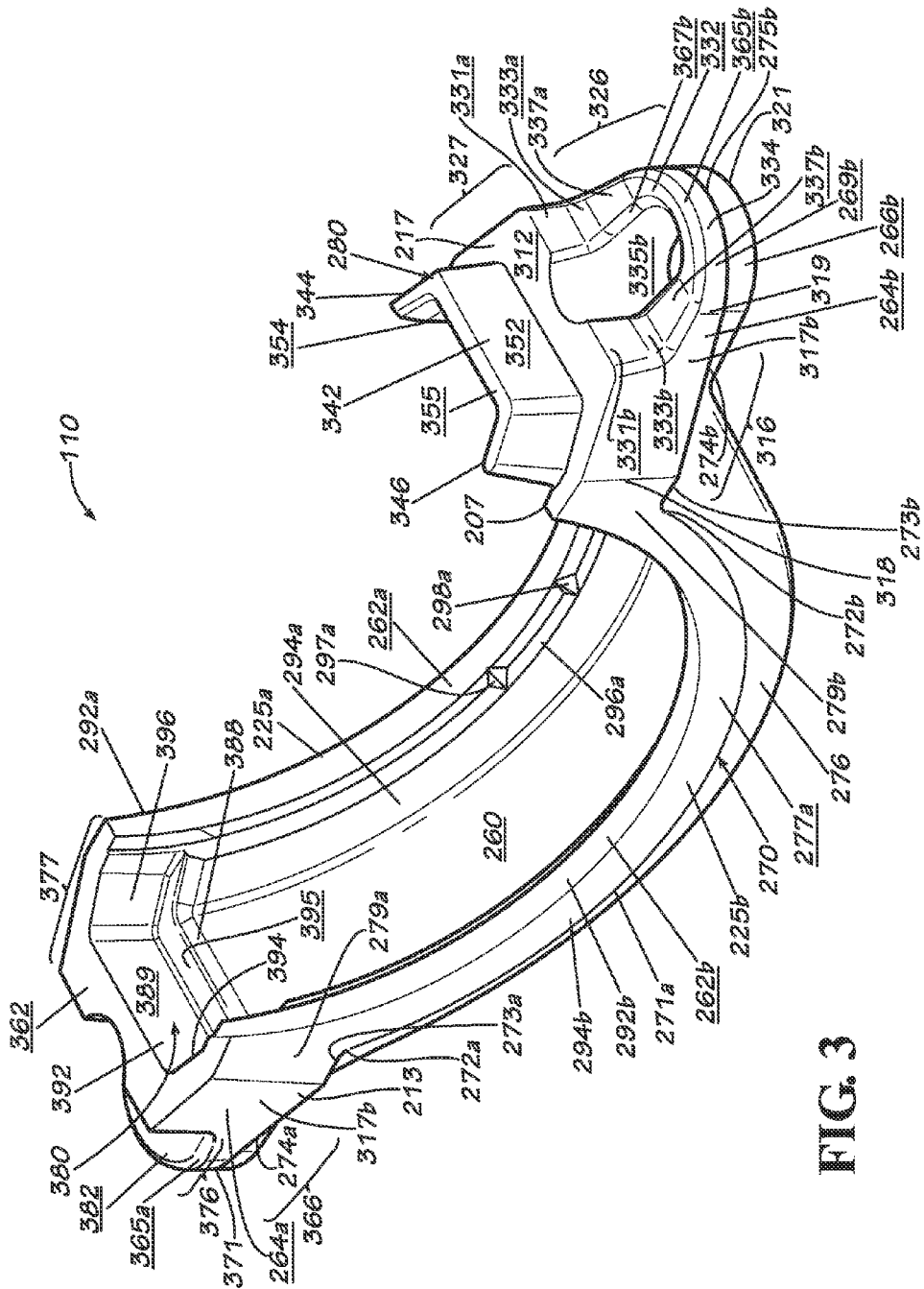
FIG. 3 is an inner perspective view of the segment of FIG. 2.

As can be seen from the view of FIG. 3, the shoulder 217 includes a taper portion 326. The taper portion 326 terminates at the end 334 of the shoulder 217 and melds at the other end with a parallel portion 327 of the shoulder 217. As previously described, the bottom surface 312 is parallel to the top surface 314 in the parallel portion 327. Ledge surfaces 331a,b extend to the taper portion 326, which includes curved bottom transition surfaces 333a,b, slanted bottom transition surfaces 337a,b, and a horizontal bottom surface 332, none of which are parallel to the top surface 364. Lower pad rim surface 365b extends along the outer edges of ledge surfaces 331a,b, curved bottom transition surfaces 333a,b, slanted bottom transition surfaces 337a,b and horizontal bottom surface 332. Lower pad rim surface 365b also borders shoulder end surface 264b. In addition, lower hole rim surface 367b extends along the inner edges of ledge surfaces 331a,b, curved bottom transition surfaces 333a,b, slanted bottom transition surfaces 337a,b and horizontal bottom surface 332. Lower hole rim surface 367b also borders hole inner surfaces 335b.

The tongue 280 includes three portions in the current embodiment: a central portion 342, a first side portion 344, and a second side portion 346. The side portions 344,346 are oriented with respect to the central portion 342 such that an angle is formed between each. In the current embodiment, the angle is greater than ninety degrees. The tongue 280 includes an outer surface 352, an inner surface 354, and a mating surface 355. The mating surface 355 is located on a leading edge of the tongue 280.

Shown along the other end 203 is the other shoulder 213. The shoulder 213 includes a bottom surface 362 that is substantially parallel with top surface 314. The shoulder 213 includes a draft portion 366 and a radiused portion 371. A taper portion 376 is included just like with shoulder 217. A parallel portion 377 is also included where the bottom surface 362 is parallel to the top surface 364 in the region. Ledge surfaces 381a,b (381a shown in FIG. 2, 381b not shown) are also included just like ledge surfaces 331a,b. Curved bottom transition surfaces 383a,b (not shown), slanted bottom transition surfaces 385a,b (not shown), and a horizontal bottom surface 382 are also included, similar to curved bottom transition surfaces 333a,b, slanted bottom transition surfaces 337a,b, and a horizontal bottom surface 332. These surfaces are also bordered by lower pad rim surface 365a and lower hole rim surface 367a (shown in FIG. 9), similar to lower pad rim surface 365b and lower hole rim surface 367b.

A groove 380 is defined in the shoulder 213. The groove 380 is sized to accept the tongue 280. The groove 380 includes a central wall 392 and two side walls 394,396. The groove 380 is further defined by a mating surface 395. In assembly, the mating surface 395 contacts the mating surface 355' of another segment 110'. A groove shoulder surface 389 is included on the inside of the groove 380. A draft portion 388 can be seen proximate the end of the segment 110 nearest the groove 380. The draft portion 388 provides a relief from the inner surface 260 to the mating surface 395 to line up with the tongue 280' of the segment 110' (shown in FIG. 10), which is slightly set back from an inner surface 260' of the segment 110' which is substantially identical to inner surface 260 of the segment 110. The draft portion 388 helps prevent the coupling 100 from pinching the gasket 150 during installation, as pinching of the gasket 150 can lead to failure of the gasket 150 including slicing and rupture of the gasket 150.

Each edge portion 225a,b of the segment 110 includes a contacting portion 292a,b and a support portion 294a,b. The contact surface 262a,b is included at the end of the contacting portion 292a,b. The shoulder surface 296a (296b not shown) can be seen at the inside end of the support portion 294a (inside end of the support portion 294b not shown). Three nodes 297a,298a (297b,298b shown in FIG. 6, 299a,b not shown) protrude from the shoulder surface 296a,b between the support portion 294a,b and the contacting portion 292a,b. Each node 297a,b and 298a,b include a width that decreases from the support portion 294a,b to the contacting portion 292a,b. Although the nodes 297a,b, 298a,b, and 299a,b are pyramidal in the current embodiment, they may be various shapes in various embodiments.

The gasket 150 is designed to interact with the inner surface 260 of each segment 110 in the pipe coupling 100. In the current embodiment, the gasket 150 also interacts with inner surface 354 of the tongue 280.

Figure 4:
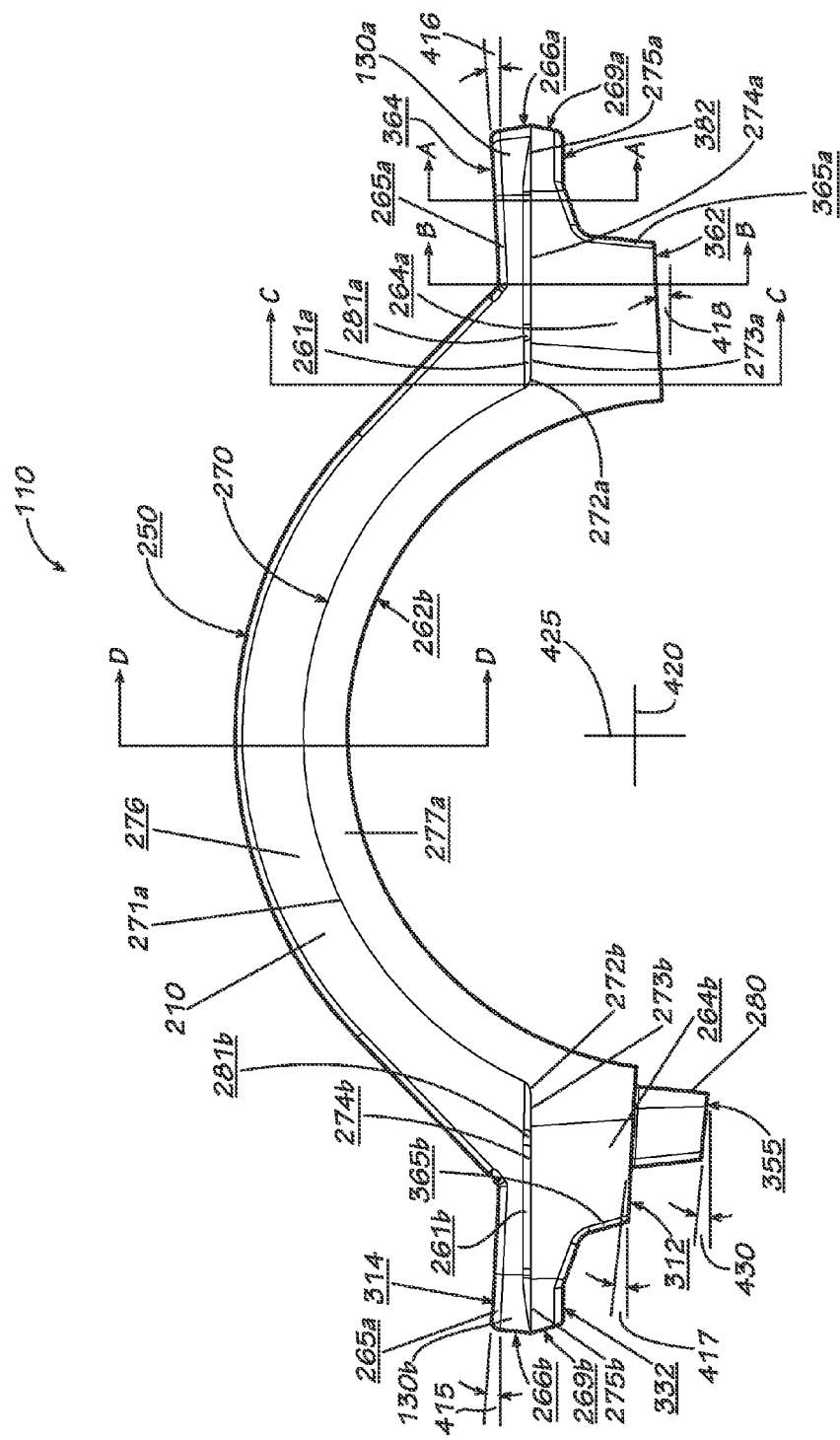
FIG. 4 is a side view of the segment of FIG. 2.

As seen in the side view of FIG. 4, the top surfaces 314,364 and the bottom surfaces 312,362 are aligned at angles 415, 416,417,418 with respect to horizontal axis 420 of the segment 110. The angles 415,416,417,418 allow for deformation of the segment 110 in use. In some embodiments, the angles 415,416,417,418 will be zero such that the top surfaces 314, 364 are aligned with the horizontal axis 420 when no deformation is present. The tip angle 430 of the tongue 280 can be seen such that the mating surface 355 is aligned angularly with respect to the horizontal axis 420. The tip angle 430 is greater than the other angles 415,416,417,418 in the current embodiment, although other configurations may be found in various embodiments. When the segment 110 is deformed, the mating surface 355 contacts the mating surface 395' of another segment 110'. In various embodiments, the tip angle 430 is approximately the same as the angles 415,417 of the top surface 314 and bottom surface 312, respectively.

The parting line 270 may also be seen in side view of FIG. 4. In the current embodiment, the body line portions 271a,b follow the curve of the body 210 and, prior to deformation of the segment 110, when the segment 110 is at rest, the lateral line portions 273a,b,c,d, tapering line portions 274a,b,c,d, and radiused line portions 275a,b are all parallel to horizontal axis 420. In addition, in the current embodiment, horizontal bottom surface 332 and horizontal bottom surface 382 are also parallel to horizontal axis 420 and coplanar prior to deformation of the segment 110.

In the current embodiment, the parting line 270 at radiused line portions 275a,b are at exterior edges of the segment 110 along horizontal axis 420. Further, as can be seen in FIG. 4, the parting line 270 along each fastener pad 130a,b, including lateral line portions 273a,b,c,d, tapering line portions 274a, b,c,d, and radiused line portions 275a,b, is offset from top surfaces 314,364 so that the parting line 270 is separated along the vertical axis 425 from top surfaces 314,364 by upper body surface 276, curved transition surfaces 261a,b,c, d, and step surfaces 263a,b,c,d. The parting line 270 along each fastener pad 130a,b, including lateral line portions 273a, b,c,d, tapering line portions 274a,b,c,d, and radiused line portions 275a,b, is also offset from horizontal bottom surfaces 382, 332 so that the parting line 270 is separated along the vertical axis 425 from horizontal bottom surfaces 382, 332 by upper body surface 276, curved transition surfaces 261a,b,c,d, and step surfaces 263a,b,c,d. Upper curved end surfaces 266a,b slope upwardly and slightly inwardly from radiused line portions 275a,b towards top surfaces 364,314, respectively. Lower curved end surfaces 269a,b slope downward and slightly inwardly from radiused line portions 275a,b towards horizontal bottom surfaces 382, 332, respectively.

As seen in the top view of FIG. 5, parting line 270 extends completely around the periphery of segment 110, providing an outermost edge or boundary of the segment 110 when projected on a plane formed by horizontal axis 420 and longitudinal axis 520 of the segment 110. Therefore parting line 270 forms axially outermost and horizontally outermost edges of segment 110, including outermost edges along the fastener pads 130a,b. Thus, in the current embodiment, the outermost edge of each fastener pad 130a,b is integral with the parting line 270. When viewed from the top or the bottom of the segment 110, the entirety of segment 110 is outlined by the parting line 270. In other embodiments, parting line 270 may form an outermost boundary of the segment 110 along any plane that bisects the segment 110. In addition, FIG. 5 also shows that body line portions 271a,b, transition line portions 272a,b,c,d, and lateral line portions 273a,b,c,d are parallel to horizontal axis 420.

Figure 6:
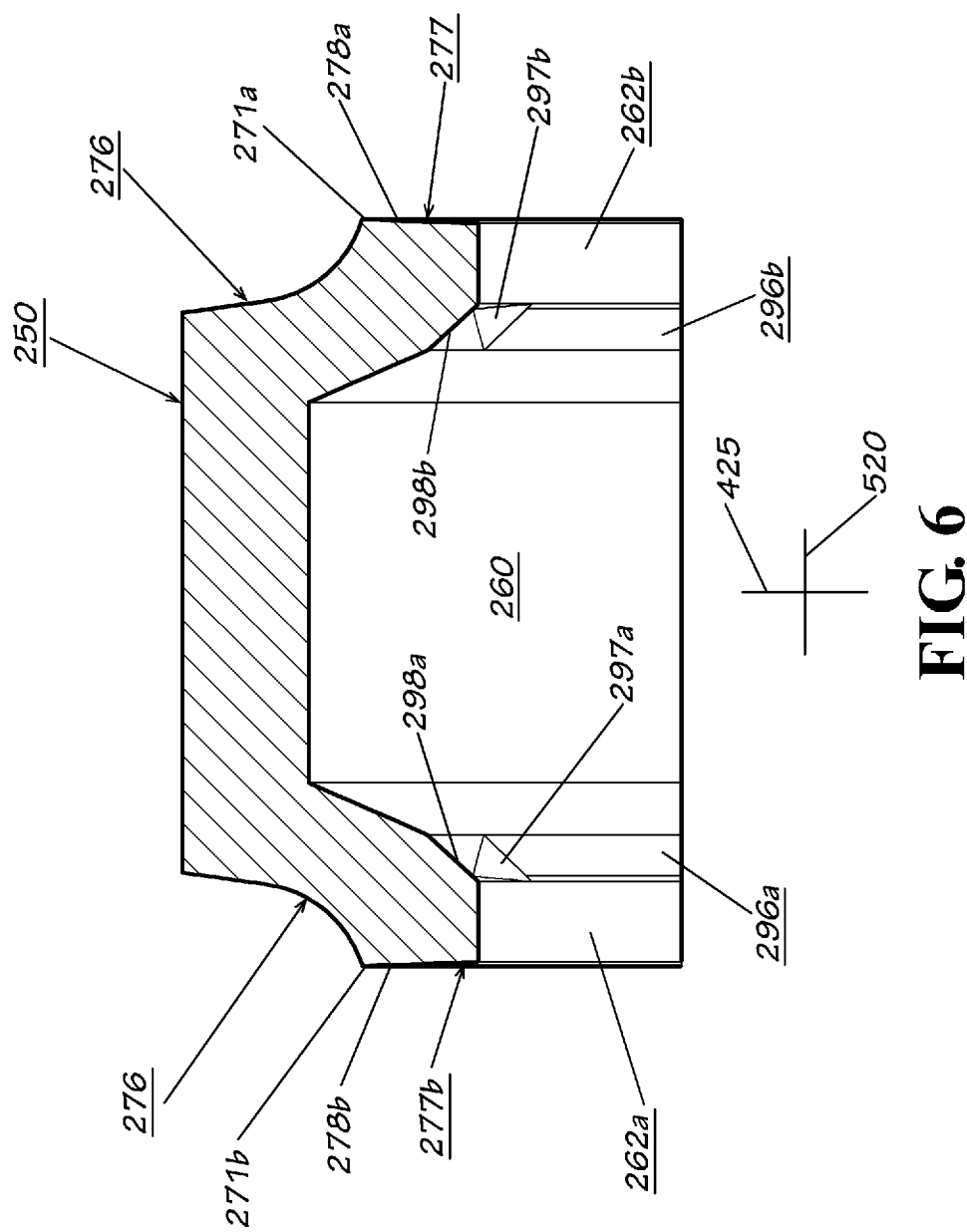
FIG. 6 is a cross-sectional view of the segment of FIG. 2 taken along line D-D shown in FIG. 4.

FIG. 6 shows a cross-section of segment 110 taken at line D-D shown in FIGS. 3 and 4. In the current embodiment, the parting line 270 at body line portions 271a,b are at axially exterior edges of the segment 110 along longitudinal axis 520. Upper body surface 276 curves upwardly and axially inwardly from body line portions 271a,b. Lower body surfaces 277a,b at arced surface portions 278a,b slope downward and slightly axially inwardly from transition line portions 272a,c towards contact surfaces 262a,b.

FIG. 7 shows a cross-section of segment 110 taken at line C-C shown in FIGS. 3 and 4. In the current embodiment, the parting line 270 at transition line portions 272a,d are at axially exterior edges of the segment 110 along longitudinal axis 520. Upper body surface 276 slopes upwardly and axially inwardly from transition line portions 272a,d. Lower body surfaces 277a,b at surface end portions 279a,d slope downward and slightly axially inwardly from transition line portions 272a,d towards bottom surface 362.

FIG. 8 shows a cross-section of segment 110 taken at line B-B shown in FIGS. 3 and 4. In the current embodiment, the parting line 270 at tapering line portions 274a,d are at axially exterior edges of the segment 110 along longitudinal axis 520. Step surfaces 263a,b,c,d slope slightly upwardly and axially inwardly from tapering line portions 274a,d. Shoulder end surfaces 264a,b d slope downward and slightly axially inwardly from tapering line portions 274a,d towards shoulder bottom surface 362.

FIG. 9 shows a cross-section of segment 110 taken at line A-A shown in FIGS. 3 and 4. In the current embodiment, the parting line 270 at tapering line portions 274a,d are at axially exterior edges of the segment 110 along longitudinal axis 520. Step surfaces 263a,b,c,d slope slightly upwardly and axially inwardly from tapering line portions 274a,d. Shoulder end surfaces 264a,b d slope downward and slightly axially inwardly from tapering line portions 274a,d towards shoulder bottom surface 362. Also visible in FIG. 9 is hole inner surface 335a, upper hole rim surface 232a and lower hole rim surface 367a, forming a continuous surface from top surface 314 to bottom surface 362.

Figure 10:
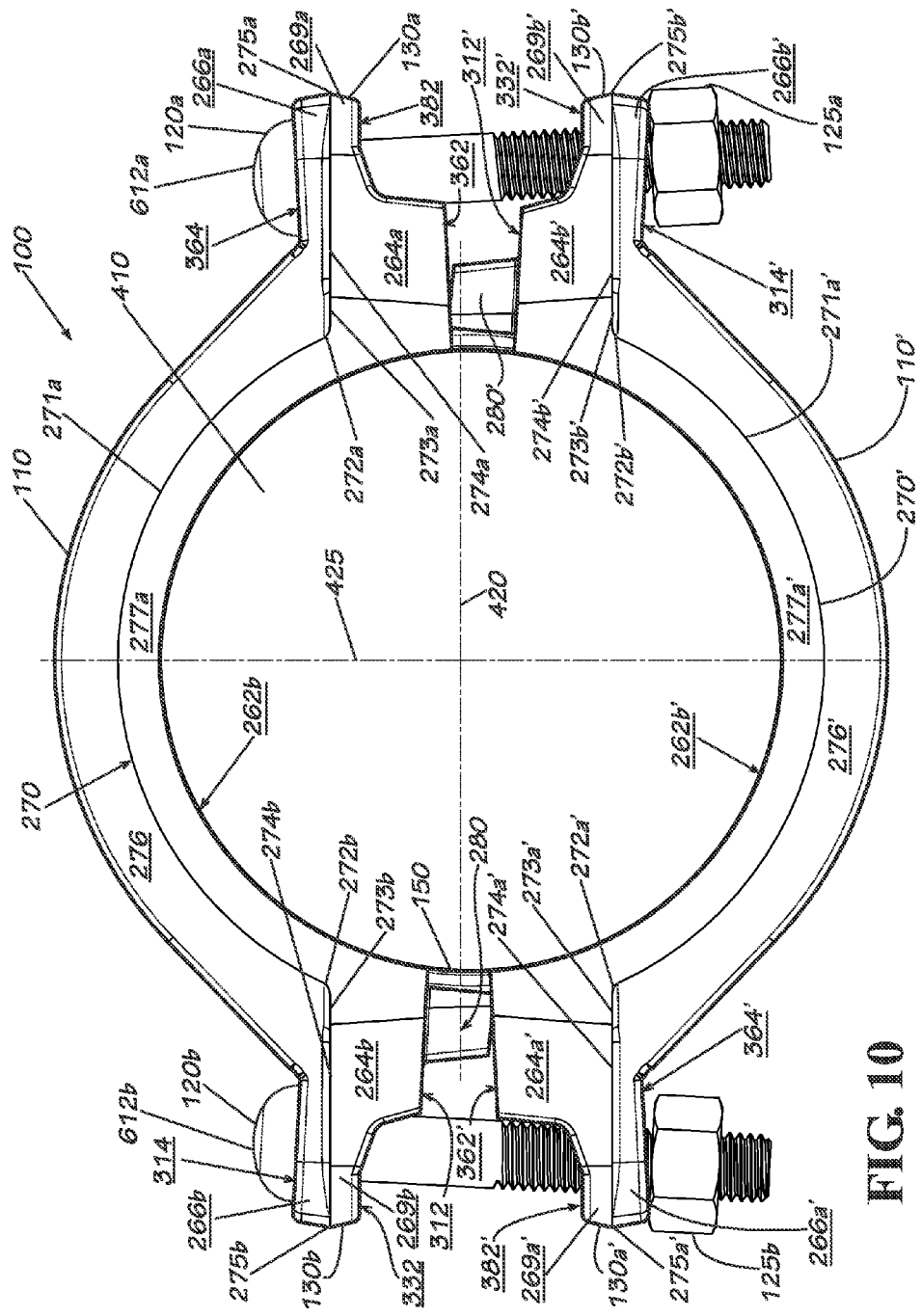
FIG. 10 is a side view of the coupling of FIG. 1 in an assembled and untightened position.

FIG. 10 shows the coupling 100 in an assembled but untightened position. It can be seen in this view that each top surface 314,314' is parallel to each bottom surface 312,312', respectively. Likewise, each top surface 364,364' is parallel to each bottom surface 362,362', respectively. However, the fastener pads 130a,b,a',b' are not aligned. In other words, the surfaces of adjacent fastener pads 130a,b,a',b' are not parallel. As can be seen, top surface 314 is not parallel to top surface 364 because angles 415 and 416 do not align. This angular misalignment allows each segment 110,110' to deform, or deflect, under tightening pressure of the bolts 120a,b and nuts 125a,b to provide so that the top surfaces 314,314' and 364,364' are substantially parallel when the segments 110,110' are deformed. In various embodiments, the top surfaces 314,314' and 364,364' may be parallel before deforming the segments 110,110'. In such embodiments, the top surfaces 314,314' and 364,364' may be non-parallel after deformation. However, in the current embodiment, horizontal bottom surfaces 332, 382 are parallel to horizontal bottom surface 382',332'.

As can be seen in FIG. 10, the annular nature of the gasket 150 defines a coupling void 410 within the gasket 150 that is adapted for certain diameters of the pipe elements 710a,b. In practice, when pipe elements 710a,b are introduced within the gasket 150, they are placed inside the coupling void 410. Also seen in FIG. 6, the bolts 120a,b are angled with respect to the vertical axis 425 such that heads 612a,b of the bolts 120a,b sit flush against the top surfaces 314,364. In an alternative embodiment, a central axis of each of the bolts 120a,b may be parallel to the vertical axis 425 such that heads 612a,b of the bolts 120a,b sit at an angle with the top surfaces 314, 316. In the current embodiment, the gasket 150 sits within the segments 110,110'.

As can be seen in FIG. 10, in the current embodiment, the parting lines 270,270' are parallel along the fastener pads 130a,b,a',b' prior to deformation of the segments 110,110'. Lateral line portions 273a,b,c,d, tapering line portions 274a, b,c,d, and radiused line portions 275a,b are parallel with lateral line portions 273a',b',c',d', tapering line portions 274a',b',c',d', and radiused line portions 275a',b'. However, in alternative embodiments, parting lines 270,270' are not parallel prior to deformation.

Tightening of the tightening elements (bolts 120a,b and nuts 125a,b) seats the gasket 150 against the pipe elements 710a,b. When the segments 110,110' are properly deformed and the gasket 150 is properly seated, the coupling 100 is engaged to and restrains the pipe elements 710a,b from pull-out because the contacting portion 292a,b.a',b' (not shown in FIG. 10) of each segment 110,110' is seated inside at least one groove of at least one pipe element 710a,b. The gasket 150 is compressed in sealed engagement with the pipe elements 710a,b. Such deformation allows heads 612a,b of the bolts 120a,b to seat flush against the top surfaces 314,364 of segment 110 while nuts 125a,b seat flush against the top surfaces 314',364' of segment 110'.

Upon compression of the gasket 150 by the segments 110, 110', the gasket 150 will most naturally deform from about circular in shape to an oblong shape. In most applications, compression by the segments 110,110' on the gasket 150 will compress the gasket 150 along the vertical axis 425, but the gasket 150 will tend to extend along the horizontal axis 420. This occurs particularly because the segments 110,110' first contact the pipe elements 710a,b—and, thus, first compress the gasket 150—at a point central to the segments 110,110'. As shown in FIG. 10, the tongues 280,280' of the segments 110,110' extend beyond the horizontal axis 420, thereby preventing the annular deformation of the gasket 150. The restraint against oblong deformation provided by the tongues 280,280' promotes more uniform compression of the gasket 150 against the pipe elements 710a,b, thereby providing a more reliable seal.

In the current embodiment, the coupling 100 is assembled in the untightened position of FIG. 10 before use. In other embodiments, the coupling 100 may be assembled in various pieces as part of the method of use.

Figure 11:
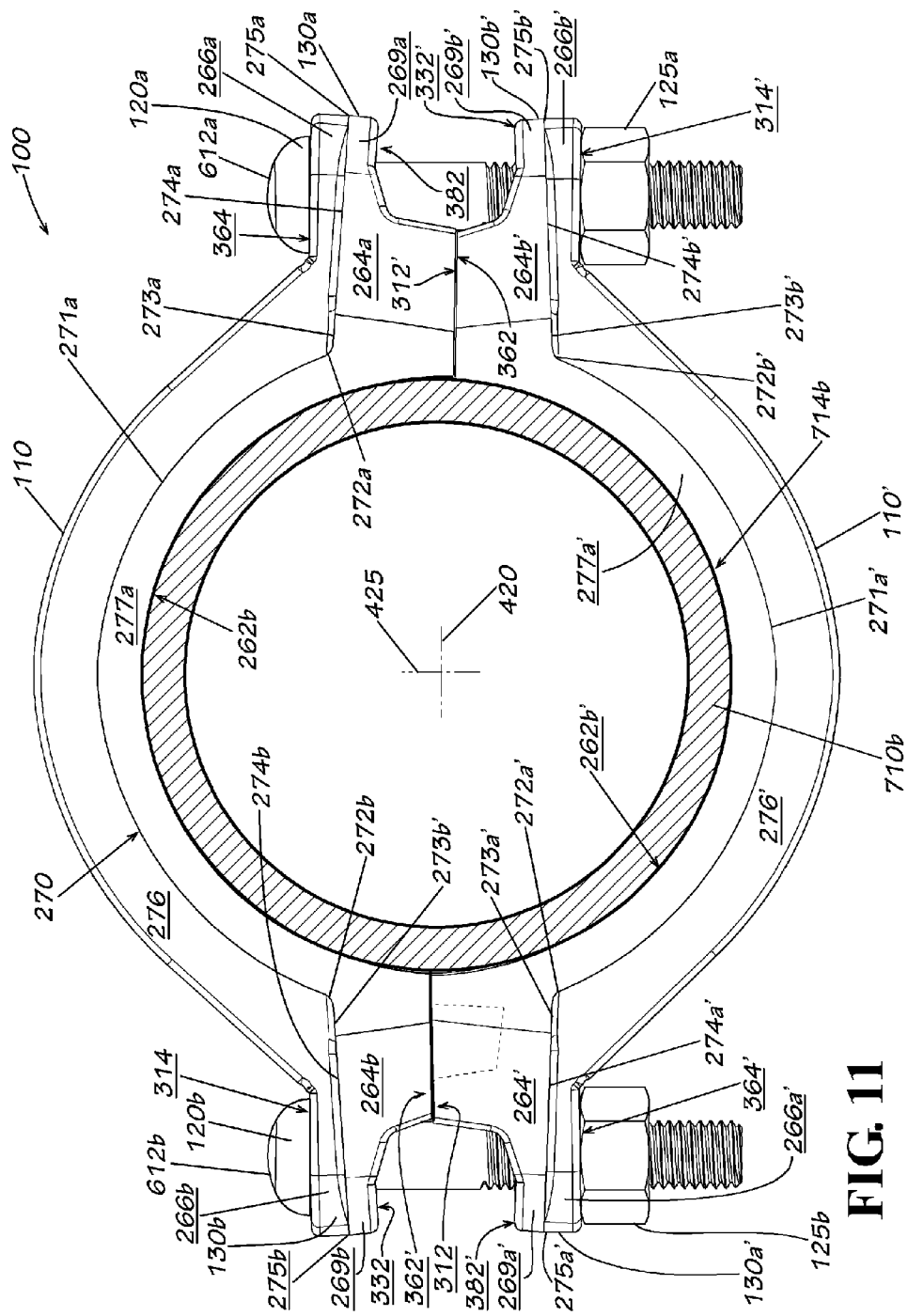
FIG. 11 is a side view of the coupling of FIG. 1 in an assembled and tightened position, including a cross-sectional view of pipe elements.

The coupling 100 in FIG. 11 is shown tightened and deformed around a pair of pipe elements 710b,a (710a not shown). The segments 110,110' in the current view are fully deformed in the current embodiment, and contact surfaces 262b,a' touch a groove surface 714b,a (714a not shown), which is the outer surface of the pipe elements 710b,a within grooves 720b,a (not shown) at each end of the pipe elements 710a,b. Contact surface 262a of segment 110 and contact surface 262a' of segment 110' are not shown in FIG. 11 because they are obstructed by the view. As described above, in some embodiments, the shoulder surfaces 296a,b,a',b' may contact an outermost surface of each pipe element 710a,b outside of the grooves 720b,a (not shown), and the contact surfaces 262a,b,a',b' may never contact the groove surface 714a,b of each pipe element 710a,b within each grooves 720a,b. In other embodiments, the contact surfaces 262a,b, a',b' contact the groove surfaces 714a,b.

As can be seen in FIG. 11, in the current embodiment, the parting lines 270,270' are no longer parallel along the fastener pads 130a,b,a',b' upon deformation of the segments 110,110' around the pipe elements 710a,b. Lateral line portions 273a, b,c,d, tapering line portions 274a,b,c,d, and radiused line portions 275a,b are not parallel with lateral line portions 273a',b',c',d', tapering line portions 274a',b',c',d', and radiused line portions 275a',b'. However, in alternative embodiments, parting lines 270,270' may be parallel after deformation.

In practice, the segment 110 is formed by casting wherein the material from which the segment 110 is formed is placed in liquid form into a mold having an exterior and an interior, the interior defining an interior surface. The material is then allowed to solidify within the mold in a cavity of the mold defined by the interior surface of the mold to form the segment 110. The material may be placed in the mold by any known method, including pouring or injecting the material into a hole defined in the exterior of the mold and extending through the mold to the cavity. The mold is then removed from around the segment 110. In some embodiments, the mold includes two mold halves joined together and defining the cavity therebetween that is shaped like the segment 110 and in which the segment 110 is formed in the mold.

The mold can be created by numerous methods and can be formed from numerous materials. The mold may be obtained by creating the mold or by procuring the mold from a third party. In some embodiments, the mold may be formed from sand. In these embodiments, a pattern in the shape of segment 110 is created. The pattern is then surrounded by casting sand and the pattern is thereafter removed, creating the cavity in the mold. The mold may be made from two halves with this process by surrounding one side of the segment 110 at a time with casting sand. The pattern may be formed from metal, plastics, wood, wax, foam, or other materials. In some embodiments, the pattern may remain within the mold during the casting process. Where the pattern remains in the mold, the pattern evaporates from the mold when the liquid material is poured into the cavity of the mold.

When the two halves of the mold are joined together to form the cavity wherein the segment 110 is cast, the border along the wall of the cavity where the two halves meet forms a border line and follows the parting line 270 when the segment 110 is formed in the cavity. In some embodiments, the hole in the mold through with the material is delivered to the cavity to form the segment 110 may be defined between the two joined halves or may be defined with one of either of the two halves. When the segment 110 is cast, the mold therefore forms segment 110 with the parting line 270 formed along the border where the two halves of the mold meet.

Because the parting line 270 provides a continuous outermost edge or boundary of the segment 110, as discussed previously with respect to FIG. 5, the parting line 270 allows for easy removal of the segment 110 from the mold. One of the two halves may be easily removed from around the segment 110 because each surface adjacent to the parting line 270 and the first of the two halves slopes inwardly from the parting line 270. After the removal of the first of the two halves, the segment 110 may also be easily removed from the second of the two halves approximately along the vertical axis 425 because each surface adjacent to the parting line 270 and the second of the two halves slopes inwardly from the parting line 270. In the current embodiment, curved transition surfaces 261a,b,c,d, step surfaces 263a,b,c,d, and upper body surface 276, including upper curved end surfaces 266a,b, are all adjacent to and contact the wall of the cavity of one of the two halves during formation of the segment 110. Likewise, lower body surfaces 277a,b and shoulder end surfaces 264a,b, including lower curved end surfaces 269a,b, are all adjacent to and contact the wall of the cavity of the second of the two halves during formation of the segment 110.

Because the surfaces adjacent the parting line 270 slope inwards from the parting line 270, friction during removal of the segment 110 is reduced between the surfaces adjacent the parting line 270 and the corresponding surfaces of the cavity of the mold halves. Reduction of this friction allows for easier removal of the segment 110 from the mold halves, including the prevention of pieces of the segment 110 becoming stuck to the cavity walls during removal and thus potentially causing damage to the segment 110 during casting.

In some embodiments, the parting line 270 also provides for ease of removal of the segment 110 from the mold because the portions of the parting line 270 at each fastener pad 130a,b are parallel to horizontal axis 420 and coplanar. The lateral line portions 273a,b,c,d, tapering line portions 274a,b,c,d, and radiused line portions 275a,b are all parallel to horizontal axis 420 and coplanar in the current embodiment. This configuration prevents movement of the halves of the mold relative to each other because it minimizes sloping of the facing surfaces of the mold halves. This configuration also provides for easier creation of the mold.

In addition, in the current embodiment, the surfaces along fastener holes 132a,b and fastener pads 130a,b also allow for easy removal of the segment 110 from the two halves of the mold. Upper hole rim surfaces 232a,b and lower hole rim surfaces 367a,b provide rounded edges to the fastener holes 132a,b to allow for easier removal of the segment 110 from the mold halves, as unrounded edges introduce unnecessary friction to the removal of the segment 110 and may therefore potentially cause damage to the segment 110. In addition, upper pad rim surface 265a,b and lower pad rim surface 365a,b also provide rounded edges to the fastener pads 130a,b that similarly allow for easier removal of the segment 110 from the mold halves, preventing friction and damage that may be caused by unrounded edges.

Because parting line 270 is offset from the top surfaces 314,364 of each fastener pad 130a,b, the parting line 270 also provides for tongue 280 and groove 380 to be fabricated with thicker walls than if the parting line 270 was not offset from the top surfaces 314,364. In previous configuration, parting lines were located on the edge of the top surfaces of fastener pads and were not offset from the top surfaces. By offsetting parting line 270 from the top surfaces 314,364, the outermost edge of the segment 110 is lowered closer towards ends 203,207. Therefore the thickest portion of the segment 110 is closer to the ends 203,207 than in previous configurations, allowing the tongue 280 to have thicker walls and thereby strengthening the walls of the tongue 280. This configuration also allows the leading edge of the tongue 280 to extend further from the ends 203,207 than in prior configurations while maintaining structural integrity and a minimum thickness.

When the segment 110 is cast, the outer surface 352 of the tongue 280 may slope inwards from end 207 to allow for easy removal from the mold. The outer surface 352 of the tongue may also slope inwards from bottom surface 312. In embodiments where the outer surface 352 of the tongue 280 slopes inwards from end 207, it is still desirable to maximize the thickness of the central portion 342, the first side portion 344, and the second side portion 346 to increase the structural strength and integrity of the tongue 280 while allowing for the gasket 150 to sit within the tongue 280 and maintaining a minimum inward slope to allow for removal of the segment 110 from the mold. It is also desirable in some embodiments to maximize the distance between bottom surface 312 and mating surface 355 of the tongue 280. In some embodiments, the minimum slope may be approximately 6 degrees from the vertical axis 425. When the parting line 270 is offset from top surfaces 314,364, the parting line 270 therefore allows for central portion 342, the first side portion 344, and the second side portion 346 to be thicker than if the parting line 270 is not offset from top surfaces 314,364 and also lengthens the allowable distance between bottom surface 312 and mating surface 355 of the tongue 280. Offsetting parting line 270 from top surfaces 314,364 also similarly provides for the central wall 392 and two side walls 394,396 of groove 380 to be thicker than if the parting line 270 is not offset from top surfaces 314,364.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and subcombinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe coupling comprising at least one coupling segment, each segment including an outer surface;
   an inner surface, the outer surface and the inner surface both having a substantially curved shape;
   two ends;
   a fastener pad protruding proximate to each end;
   a parting line extending around each segment, the parting line forming an axially outermost edge along each axial side of each coupling segment, the parting line offset from an outermost top surface of each fastener pad towards a bottom surface of each fastener pad;
   a contact surface facing radially inwardly;
   an upper body surface adjacent the parting line sloping inwardly from the parting line towards a vertical axis of the segment; and
   a lower body surface adjacent the parting line sloping inwardly from the parting line towards the vertical axis of the segment.

2. The pipe coupling of claim 1, wherein the parting line forms a continuous outermost edge around each segment.

3. The pipe coupling of claim 2, wherein the parting line is offset from the outer surface of each segment.

4. The pipe coupling of claim 1, wherein the upper body surface includes an upper curved end surface, the upper curved end surface bordering a radiused line portion of the parting line, the upper curved end surface sloping inwardly toward the outermost top surface of the fastener pad.

5. The pipe coupling of claim 1, wherein each coupling segment includes a tongue at an end of each coupling segment.

6. The pipe coupling of claim 1, wherein portions of the parting line extending around each fastener pad are coplanar with each other when the at least one coupling segment is at rest.

7. The pipe coupling of claim 6, wherein the top surfaces of each fastener pad are not coplanar when the at least one coupling segment is at rest.

8. The pipe coupling of claim 1, wherein portions of the parting line extending around each fastener pad form an outermost horizontal and axial edge along each fastener pad.

9. The pipe coupling of claim 1, wherein portions of the parting line extending around each fastener pad are not parallel with the top surfaces of each fastener pad.

10. The pipe coupling of claim 1, wherein portions of the parting line extending around each fastener pad are parallel to a horizontal axis when the at least one coupling segment is at rest.

11. The pipe coupling of claim 1, wherein the lower body surface includes a lower curved end surface, the lower curved end surface bordering a radiused line portion of the parting line, the lower curved end surface sloping inwardly from the radiused line portion of the parting line toward the bottom surface of the fastener pad.

12. The pipe coupling of claim 1, wherein the contact surface is cylindrical when the at least one segment is deformed against a pipe.

13. The pipe coupling of claim 1, wherein an axial length of the contact surface is shorter than a radial length of a body surface adjacent to the contact surface and facing axially outward.

14. The pipe coupling of claim 1, wherein the bottom surface of the fastener pad of a first end of the two ends is coplanar with the bottom surface of the fastener pad of a second end of the two ends when the at least one coupling segment is undeformed.

15. A coupling segment comprising:
   an outer surface;
   an inner surface;
   a first end;
   a second end;
   a first fastener pad protruding proximate to the first end, the first fastener pad including a parting line forming a first axially outermost edge offset from a top surface of the first fastener pad towards a bottom surface of the first fastener pad, the first axially outermost edge defining a first plane;
   a second fastener pad protruding proximate to the second end, the second fastener pad including a parting line forming a second axially outermost edge offset from a top surface of the second fastener pad towards a bottom surface of the second fastener pad, the second axially outermost edge defining a second plane, the second plane of the second fastener pad being coplanar with the first plane of the first fastener pad when the coupling segment is undeformed and the second plane of the second fastener pad being non-coplanar with the first plane of the first fastener pad when the coupling segment is tightened against a pipe;
   a groove defined in the inner surface and extending from the first of the two end; and
   a tongue extending from the second end, the tongue symmetrical about a plane oriented perpendicular to a longitudinal axis of the coupling segment, the tongue sized to fit within a corresponding groove of a second coupling segment.

16. The coupling segment of claim 15, further comprising a parting line forming an outermost edge continuously around the segment and integral with the axially outermost edge of each fastener pad.

17. The coupling segment of claim 15, wherein a surface adjacent the top surface of each fastener pad slopes outwardly from the top surface of each fastener pad.

18. The coupling segment of claim 15, further comprising a groove in a second of the at least two ends of the segment.

19. The coupling segment of claim 15, wherein the bottom surface of the second fastener pad is coplanar with the bottom surface of the first fastener pad when the segment is undeformed.

* * * * *